(12) United States Patent
Lee et al.

(10) Patent No.: US 12,242,636 B2
(45) Date of Patent: *Mar. 4, 2025

(54) IMPLEMENTING SECURE USER-DEFINED FUNCTIONS IN A MULTI-TENANT DATABASE SYSTEM

(71) Applicant: SNOWFLAKE INC., Bozeman, MT (US)

(72) Inventors: Allison Waingold Lee, San Mateo, CA (US); Peter Povinec, Redwood City, CA (US); Martin Hentschel, Seattle, WA (US); Robert Muglia, Mercer Island, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,601

(22) Filed: Jun. 20, 2022

(65) Prior Publication Data

US 2022/0318419 A1    Oct. 6, 2022

Related U.S. Application Data

(63) Continuation of application No. 17/559,226, filed on Dec. 22, 2021, now Pat. No. 11,366,926, which is a continuation of application No. 17/333,343, filed on May 28, 2021, now Pat. No. 11,216,582, which is a continuation of application No. 16/241,463, filed on Jan. 7, 2019, now Pat. No. 11,036,881, which is a
(Continued)

(51) Int. Cl.
    *G06F 21/62*    (2013.01)
    *G06F 16/22*    (2019.01)
    *G06F 16/245*   (2019.01)
    *G06F 21/78*    (2013.01)

(52) U.S. Cl.
    CPC ...... *G06F 21/6227* (2013.01); *G06F 16/2282* (2019.01); *G06F 16/245* (2019.01); *G06F 21/6218* (2013.01)

(58) Field of Classification Search
    None
    See application file for complete search history.

(56) References Cited

U.S. PATENT DOCUMENTS

| | | | |
|---|---|---|---|
| 6,301,575 B1 * | 10/2001 | Chadha | G06F 16/2465 |
| 6,757,680 B1 * | 6/2004 | Choy | G06F 21/6227 |
| | | | 707/999.102 |
| 7,921,299 B1 | 4/2011 | Anantha et al. | |

(Continued)

OTHER PUBLICATIONS

Data integration through database federation. Haas. (Year: 2012).*
(Continued)

*Primary Examiner* — Venkat Perungavoor
(74) *Attorney, Agent, or Firm* — Womble Bond Dickinson (US) LLP

(57) ABSTRACT

Systems, methods, and devices for implementing secure user-defined function (UDF) in a multi-tenant database system are disclosed. A method includes receiving a grant to access a share object comprising usage functionality associated with a secure UDF to underlying data. The method includes accessing the share object using the grant. The method includes causing a share component to implement the secure view and the usage functionality associated with the secure UDF.

17 Claims, 17 Drawing Sheets

Related U.S. Application Data continuation-in-part of application No. 16/055,824, filed on Aug. 6, 2018, now Pat. No. 11,048,815.

(56) References Cited

U.S. PATENT DOCUMENTS

| | | | |
|---|---|---|---|
| 9,715,513 B2* | 7/2017 | Sharma | G06F 16/278 |
| 10,289,611 B2* | 5/2019 | Stegelmann | G06F 16/2291 |
| 10,528,596 B2 | 1/2020 | Shivarudraiah et al. | |
| 11,138,340 B1 | 10/2021 | Blum et al. | |
| 2006/0041544 A1* | 2/2006 | Santosuosso | G06F 16/245 |
| 2006/0265699 A1 | 11/2006 | Ali et al. | |
| 2007/0220004 A1* | 9/2007 | Fifield | G06Q 10/10 |
| | | | 707/999.009 |
| 2008/0071785 A1* | 3/2008 | Kabra | G06F 16/24547 |
| | | | 707/999.009 |
| 2008/0082540 A1 | 4/2008 | Weissman et al. | |
| 2008/0162483 A1 | 7/2008 | Becker et al. | |
| 2008/0209428 A1* | 8/2008 | Baryshnikov | G06F 16/20 |
| | | | 718/104 |
| 2011/0191751 A1 | 8/2011 | Munday et al. | |
| 2011/0196892 A1 | 8/2011 | Xia | |
| 2011/0225232 A1 | 9/2011 | Casalaina et al. | |
| 2011/0246772 A1 | 10/2011 | O'Connor et al. | |
| 2011/0307695 A1 | 12/2011 | Slater | |
| 2011/0307947 A1 | 12/2011 | Kariv et al. | |
| 2012/0191642 A1 | 7/2012 | George | |
| 2012/0209884 A1* | 8/2012 | Mattsson | G06F 21/6227 |
| | | | 707/783 |
| 2014/0095470 A1* | 4/2014 | Chen | G06F 16/24544 |
| | | | 707/716 |
| 2015/0120758 A1* | 4/2015 | Cichosz | G06F 17/16 |
| | | | 707/748 |
| 2016/0034710 A1 | 2/2016 | McReynolds et al. | |
| 2016/0188617 A1 | 6/2016 | Gaikwad | |
| 2016/0203157 A1 | 7/2016 | Kuruganti et al. | |
| 2017/0099360 A1 | 4/2017 | Levi et al. | |
| 2018/0046659 A1* | 2/2018 | Chen | G06F 16/245 |
| 2018/0091306 A1* | 3/2018 | Antonopoulos | H04L 63/0442 |
| 2018/0114190 A1 | 4/2018 | Borrel | |
| 2018/0121426 A1* | 5/2018 | Barsness | G06F 9/5011 |
| 2018/0121667 A1 | 5/2018 | Karpel et al. | |
| 2018/0196955 A1 | 7/2018 | Dageville et al. | |
| 2018/0336364 A1 | 11/2018 | Haila et al. | |
| 2019/0340284 A1 | 11/2019 | Kandukuri et al. | |
| 2019/0384929 A1 | 12/2019 | Noe et al. | |
| 2020/0042734 A1 | 2/2020 | Lee et al. | |
| 2021/0286893 A1* | 9/2021 | Lee | G06F 21/6227 |
| 2021/0303371 A1* | 9/2021 | Wang | G06F 16/245 |

OTHER PUBLICATIONS

Selectivity Estimation in Extensible Databases—A Neural Network Approach. Lakshmi. (Year: 1998).*
A Data Mining System Based on SQL Queries and UDFs for Relational Databases. Ordonez. ACM. (Year: 2011).*
Data-Intensive Cloud Computing: Requirements, Expectations, Challenges, and Solutions. Shamsi. Springer. (Year: 2013).*
Crypt-EHRServer: Protecting Confidentiality with Attribute-Based Encryption and Encrypted Query Processing. Zhang. IEEE. (Year: 2017).*
Bring Precision and Access Control to Business Document Search. Chatvichienchai. IEEE. (Year: 2008).*
Easy Domain Processing over Heterogeneous Databases: A Unified Programming Paradigm. Wang. (Year: 2010).*
TICC: Transparent Inter-Column Compression for Column-Oriented Database Systems. Liu. ACM. (Year: 2017).*
Declarative Error Management for Robust Data-Intensive Applications. Kanne. ACM. (Year: 2012).*
Dynamic Approach for Data Scrubbing Process. Ahmed. IJCSE. (Year: 2010).*
International Search Report and Written Opinion mailed on Oct. 18, 2019 for International Patent Application No. PCT/US2019/045358.
Role and Attribute Based Collaborative Administration of Intra-Tenant Cloud IaaS. Jin et al. IEEE. (Year: 2014).
Multi-tenancy authorization models for collaborative cloud services. Tang. John Wiley & Sons. (Year: 2014).
Role-Centric Circle-of-Trust in Multi-tenant Cloud IaaS. Pustchi et al. LNCS. (Year: 2016).
CQSTR: Securing Cross-Tenant Applications with Cloud COntianers. Zhai et al. So CC. (Year: 2016).
Identity Access Management for Multi-tier Cloud Infrastructures. Faraji et al. IEEE. (Year: 2014).
Comparative Analysis of Access Control Systems on Cloud. Ghazia-e-Um et al. IEEE. (Year: 2012).
Multi-tenant Database Access Control. Yaish et al. IEEE. (Year: 2013).
Design Role-Based Multi-Tenancy Access Control Scheme for Cloud Services. Yang et al. IEEE. (Year: 2013).
A Cross Tenant Access Control (CTAC) Model for Cloud Computing: Formal Specification and Verification. Alam. IEEE. (Year: 2017).
A Trust Model for Security and Privacy in Cloud Services. Himanshu. IEEE. (Year: 2017).
Authorization Management in Multi-Cloud Collaboration using Attribute-based Access Control. John. IEEE. (Year: 2016).
Migration of Web Application SIMA into Multi-tenant Saas. Nugraheni (Year: 2013).
Analysis of Cloud Computing Information Security Strategy in Biznet Networks. Sutrisno. (Year: 2013).
Identifying and Analyzing Security Threats to Virtualized Cloud Computing Infrastructures. Brohi. IEEE. (Year: 2012).
Cloud Computing: Security Threats & Control Strategy using Tri-Mechanism. Gupta. ICCICCT. (Year: 2014).
MTBase: Optimizing Cross-Tenant Database Queries. Braun. EDBT. (Year: 2018).
A Service Framework for Multi-tenant Enterprise Application in Saas Environments. Liao. (Year: 2014).
The Snowflake Elastic Data Warehouse. Dageville. ACM. (Year: 2016).
ADON: Application-Driven Overlay Network-as-a-Service for Data-Intensive Science. Antequera. IEEE. (Year: 2018).
Implementing a Storage Pattern in the OR Mapping Framework. Khan. IJGDC. (Year: 2013).
Security Aspects of Database-as-a-Service (DBaaS) in Cloud Computing. Mehak. (Year: 2014).
Big Data: A Survey. Chen. Springer. (Year: 2014).
A Comprehensive Taxonomy for the Infrastructure as a Service in Cloud Computing. Firdhous. IEEE. (Year: 2014).
Toward Lightweight Transparent Data Middleware in Support of Document Stores. Ma. IEEE. (Year: 2013).
Parallel NoSQL Entity Resolution Approach with MapReduce. Ma. IEEE. (Year: 2015).
European Patent Office Action of Application No. 19848393.5, mailed Nov. 24, 2023, 6 pages.
Ringer, Craig, "How security barriers work in PostgreSQL security_barrier views work?", 2ndQuadrant PostgreSQL, Nov. 7, 2013, 2ndQuadrant Ltd. URL:https://www.2ndquadrant.com/en/blog/how-do-postgresql-security_barrier-views-work/.

* cited by examiner

IMPLEMENTING SECURE USER-DEFINED FUNCTIONS IN A MULTI-TENANT DATABASE SYSTEM

CROSS-REFERENCE TO RELATED APPLICATIONS

This application is a continuation of U.S. patent application Ser. No. 17/559,226, filed Dec. 22, 2021, which is a continuation of U.S. patent application Ser. No. 17/333,343, filed May 28, 2021, which issued as U.S. Pat. No. 11,216,582 on Jan. 4, 2022, which is a continuation of U.S. patent application Ser. No. 16/241,463, filed Jan. 7, 2019, which issued as U.S. Pat. No. 11,036,881 on Jun. 15, 2021, which is a continuation-in-part of co-pending U.S. patent application Ser. No. 16/055,824, filed Aug. 6, 2018, which issued as U.S. Pat. No. 11,048,815 on Jun. 29, 2021, the contents of which are hereby incorporated by reference in their entirety, including but not limited to those portions that specifically appear hereinafter, the incorporation by reference being made with the following exception: In the event that any portion of the above-referenced application is inconsistent with this application, this application supersedes the above-referenced application.

TECHNICAL FIELD

The present disclosure relates to databases and more particularly relates to secure views for zero-copy data sharing in a multi-tenant database system.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

In database systems, views are commonly used as security mechanisms by which an account may restrict access to specific fields of tables to hide information. A view permits the result of a query to be accessed as if it were a table. Any query expression that returns a valid result may be utilized to create a view, including selecting columns in a table, selecting a specific range of data in table columns, and joining data from two or more tables. Views may be utilized to simplify queries and/or hide data.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Figure 1:
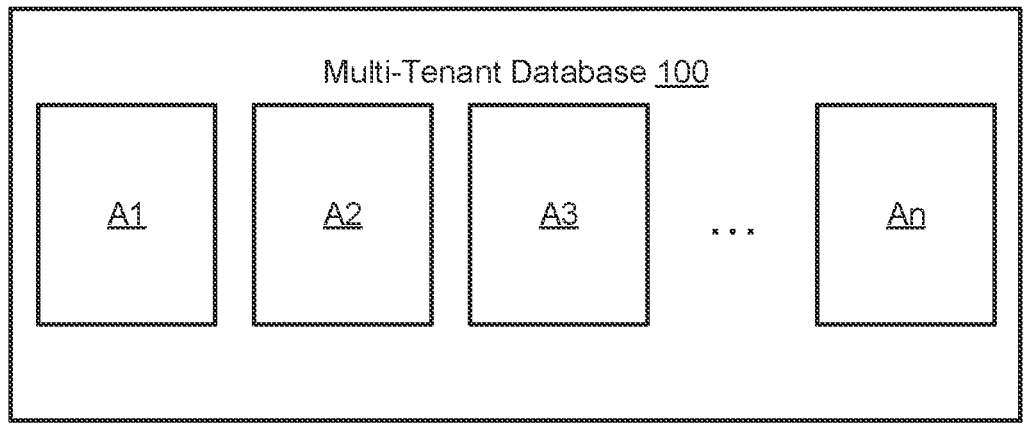
FIG. 1 is a schematic block diagram illustrating accounts in a multi-tenant database, according to one embodiment.

In database systems, views are commonly used as security mechanisms by which an account may restrict access to specific fields of tables to hide information. The implementation of views, and how the implementation of views is handled, can potentially lead to information leakage. For example, during query optimization, certain filters may be pushed across the view definition closer to input tables and the information may be leaked to a user if a user-specified filter is evaluated before secure predicates are evaluated.

A user-defined function (UDF) is a function that may be provided by a user of a program, database, or other environment. The UDF may be built into the database or environment. In a relational database management system, a UDF may provide a mechanism for extending functionality of the database server by adding a function that may be evaluated in, for example, structured query language (SQL) statements. The SQL standard may distinguish between scalar UDFs and table UDFs. A scalar UDF may return only a single value whereas a table UDF may return a relational table comprising zero or more rows where each row may have one or more columns. Once created, a UDF may be used in expressions in SQL statements.

Each user-defined function includes properties and characteristics. A scalar function returns a single data value (i.e. not a table) with a returns clause. In an embodiment, scalar functions may utilize all scalar data types with the exception of user-defined data types. A table-valued function may return the result of a single select statement and a multi-statement table-valued function may return a table.

In an embodiment, a user-defined function has a secure user-defined function definition. In such an embodiment, the UDF may be created by a first account and shared with one or more secondary accounts. The first account may grant usage privileges to the one or more secondary accounts such that the secondary accounts may, for example, utilize the functionality of the UDF without viewing any procedural logic making up the UDF.

In an embodiment, a view permits the result of a query to be accessed as if it were a table. Any query expression that returns a valid result may be utilized to create a view, including selecting columns in a table, selecting a specific range of data in table columns, and joining data from two or more tables. Views may be utilized to simplify queries and/or hide data. In addition, views can have query performance benefits. Applicant recognizes that when a view is referenced in a query, the query and the view may be processed together such that the view may be evaluated more efficiently than if it were evaluated separately.

With respect to secure views, some optimizations for views require access to underlying data in the base tables for the view. Access to the underlying data may permit data that is hidden from users of the view to be exposed by, for example, user-defined functions (UDF) or other programmatic method. Secure views as disclosed in the present application do not utilize such optimizations and ensure that users have no access to the underlying data. According to one embodiment, the query expression to create a standard view (may also be referred to as the view definition or text) may be visible to users. In such an embodiment, a user may not wish to expose the underlying tables or internal structural details for a view due to security or privacy reasons. With a secure view as disclosed in the present application, the view definition and details are only visible to authorized users i.e. users that have been granted the role that owns the view.

A view may be defined as a secure view when it is specifically designated for data privacy or to limit access to data that should not be exposed to all accounts of the underlying table. Data might be exposed in a non-secure view when, for example, an account has access to only a subset of data. An example scenario where information may be leaked includes the following. A database table includes employee data for an entire company and a view is defined to expose employee data for a single department. An account, for example belonging to a head of the single department, is granted access to the view but not the underlying table. In such an embodiment, a user may gain insight into data from other departments by querying on the view. If the filter in the query is evaluated before the join between the "employee" field and the "department" field, the user may deduce whether anyone in the entire company satisfies a certain metric (e.g. has a salary over x amount, etc.). Such a technique may be utilized to query any data within the base table. A user-defined function that carries a state across invocations can be utilized in a similar way to leak the results of even more sophisticated queries on the base table data.

Secure views permit database client accounts to expose a restricted data set to other users without the possibility of the underlying, unrestricted data being exposed to those other users. Similar to views, user-defined functions (UDFs) permit a client account to expose restricted data to other users, with additional capabilities due to argument processing and procedural language support. Secure UDFs may provide the same security guarantees as secure views.

In an embodiment, a secure view provides several security guarantees when compared against a regular view. In an embodiment, the secure view does not expose the view definition to non-owners of the view. This impacts various operations that access the data dictionary. In an embodiment, the secure view does not expose information about any underlying data of the view, including the amount of data processed by the view, the tables accessed by the view, and so forth. This impacts the statistics that are displayed about the number of bytes and partitions scanned in a query, and what is displayed in the query profile for a query referring to a secure view. In an embodiment, the secure view does not expose data from tables accessed by the view which is filtered out by the view. In such an embodiment, a client account associated with a non-secure view may access data that would be filtered out by taking advantage of query optimizations that may cause user expressions to be evaluated before security expressions (e.g. filters and joints). In such an embodiment, to achieve this requirement, the set of query optimizations that can be applied to a query containing a secure view may be restricted to guarantee that the user expressions that can leak data are not evaluated before the view is filtered.

Applicant recognizes that it may be beneficial to prevent similar information leaks. Applicant herein presents methods, systems, and devices for preventing information leaks by introducing syntax and support for secure views. Such syntax and support for secure views may prevent any of the base table data inside of the view from being leaked to a user account and may further extend support for altering existing views by setting a "secure" flag on the existing view. The secure flag may indicate that the previously unsecure view is now tagged as a secure view. With the introduction of secure views, a user may explicitly reason about the security of view definitions and expose that level of security to other accounts, so the user may implement a particular use-case of views.

Multi-tenant databases or multi-tenant data warehouse support multiple distinct customer accounts at once. As an example, FIG. 1 is a schematic block diagram illustrating a multi-tenant database or data warehouse that supports many different customer accounts A1, A2, A3, An, etc. Customer accounts may be separated by multiple security controls, including different uniform resource locators (URLs) to connect to, different access credentials, different data storage locations (such as Amazon Web Services S3 buckets), and different account-level encryption keys. Thus, each customer may only be allowed to see, read, and/or write the customer's own data. By design it may be impossible for a customer to see, read, or write another customer's data. In some cases, strict separation of customer accounts is the backbone of a multi-tenant data warehouses or database system.

In some cases it may be desirable to allow cross-account data sharing. However, no current multi-tenant database system allows sharing of data between different customer accounts in an instantaneous, zero-copy, easy-controllable fashion. Existing online data warehouses such as Amazon Redshift® do not support data sharing without physical data copying. On-premise database systems such as Oracle Database Server® or Microsoft SQL Server® do not support online data sharing by definition because of the physical distribution of individual database installations.

Based on the foregoing, disclosed herein are systems, methods, and devices for a multi-tenant online database system. Some embodiments allow the implementation of secure views for zero-copy sharing of data between different customer accounts and may make the data instantly accessible with no need to copy data. Some embodiments provide access to data using fine-grained controls to maintain separation of desired data while allowing access to data that a customer wishes to share.

According to one embodiment, a computer implemented method includes generating a share object in a first account comprising a share role. The method includes associating usage privileges of one or more views with the share object such that an underlying detail of the share object comprises a secure user-defined function definition. The method includes granting, to a second account, cross-account access rights to the share role or share object in the first account. The method further includes receiving a request from the second account to access data or services of the first account and providing a response to the second account based on the data or services of the first account. The method is such that the underlying detail of the share object comprising the secure user-defined function definition is hidden from the second account and visible to the first account.

According to one embodiment, a multi-tenant database system includes a cross-account rights component, an alias component, an access component, and a secure view component. The cross-account rights component is configured to determine that cross-account access rights to one or more shared resources have been granted to a target account by a sharer account. The alias component is configured to create, in the target account, an alias object corresponding to a shared resource of the one or more shared resources in the sharer account. The access component is configured to allow the target account to access the shared resource using a request directed to the alias object. The secure view component is configured to define a secure view for a share object, a data field of a share object, a data field of a database object, and so forth.

According to another embodiment, a method for providing access to shared data in a multi-tenant database includes determining that a first account has granted a second account access to a database object of the first account. The method includes implementing privileges for the database object of the first account such that a data field of the database object comprises a secure user-defined function definition. The method includes receiving a request from the second account to access the data object corresponding to the first account. The method includes processing the request using a virtual warehouse corresponding to the first account. The virtual warehouse includes a set of one or more compute nodes configured to access data in a storage layer corresponding to the first account to generate a response to the request. The method is such that the data field of the database object comprising the secure user-defined function definition is hidden from the second account and visible to the first account.

According to an embodiment, for queries containing secure views, a system does not expose the amount of data scanned (either in terms of bytes or partitions) or the total amount of data. This may protect the information from accounts that only have access to a subset of the data. However, an account may still make estimated observations about the quantity of underlying data based on performance characteristics of the query. For example, a query that runs twice as long may process twice as much data. While such an observation is approximate at best, in some cases it may be undesirable for even this level of information to be exposed. In such cases, systems, methods, and devices of the disclosure are configured to materialize data per user/role rather than exposing views on the base data to an account. In the case of a widgets table comprising data on a plurality of varying widgets, a table may be created for each role that has access to a subset of the widgets table, and that table will contain only the subset of widgets accessible by that role, and that role would be granted access only to its table. Such an implementation can provide highly secure views and may be beneficial in certain cases.

Embodiments disclosed herein provide systems, methods, and devices for sharing a "share object" or "database object" between a sharer account and one or more other accounts in a database system. The share object or database object in one implementation may include procedural logic that is defined by a user of a client account (in one implementation, by a user of the sharer account). The share object may be supported in scalar and table-valued user-defined functions (UDFs) and may be defined by any suitable language. In an implementation, the procedural logic of the share object may be used by one or more other accounts without permitting the one or more other accounts to view the underlying code defining the procedural logic. The share object or database object may further include database data such as data stored in a table of the database. The share object or database object may include metadata about database data such as minimum/maximum values for a table or micro-partition of a database, underlying structural or architectural details of the database data, and so forth. The share object may include a listing of all other accounts that may receive cross-account access rights to elements of the share object. The listing may indicate, for example, that a second account may use procedural logic of the share object without seeing any underlying code defining the procedural logic. The listing may further indicate, for example, that a third account may use database data of one or more tables without seeing any structural information or metadata about the database data. The listing may indicate any combination of usage privileges for elements of the share object, including whether secondary accounts may see metadata or structural information for database data or procedural logic.

The embodiments disclosed herein may be supported in scalar and table-valued user-defined functions (UDFs). Various languages may be utilized including SQL and Javascript for each of the scalar and table-valued UDFs.

In an embodiment, a scalar SQL UDF includes a SQL expression that including parameters that may be replaced with arguments appearing in the function invocation. The expression may include a query expression (i.e. a subquery), and in an embodiment, the query expression must be guaranteed to return a single row and a single column. At compile-time, a function invocation is replaced with the SQL expression and parameters in the expression are replaced with the invocation's arguments. The result may be a simple SQL expression or a subquery (may be correlated or non-correlated). In an embodiment, because a scalar SQL UDF may include arbitrary SQL expressions, the secure UDF may be configured to (1) not expose the view definition to non-owners of the view and (2) not expose information about any underlying data of the view.

In an embodiment, a table-valued SQL UDF is similar to a view wherein the query may include parameters. As a result, table-valued UDFs may appear as correlated tables and may be decorrelated during query compilation. In an embodiment, because a table-valued SQL UDF can include arbitrary SQL expressions, the secure UDFs may be configured to (1) not expose the view definition to non-owners of the view, (2) not expose information about any underlying data of the view, and (3) not expose data from tables accessed by the view which is filtered out by the view.

In an embodiment, a scalar Javascript UDF is converted to a built-in function that evaluates a piece of Javascript code for reach row that is processed and passes arguments from those rows into the function. In an embodiment, because a Javascript UDF cannot access database tables, the UDF may be configured to (1) not expose information about any underlying data of the view and (2) not expose data from tables accessed by the view which is filtered out by the view.

In an embodiment, a table-valued Javascript UDF is processed such that rows are grouped together and the Javascript code is evaluated per group and row processed by passing expressions from rows into the function. In an embodiment, because a Javascript UDF cannot access database tables, the UDF may be configured to (1) not expose information about any underlying data of the view and (2) not expose data from tables accessed by the view that are filtered out by the view.

Embodiments disclosed herein provide technology which may be used for sharing data between different customer accounts in an online database and/or online data warehouse. In one embodiment, data sharing is enabled using cross-account role grants that allow users in one customer account to access data in another customer account in a controlled and instantaneous fashion, without the need to copy data. For example, the shared data may remain within the sharing account while allowing a foreign account to perform queries or other processes on the account, within their rights (e.g., read, write, etc.).

Embodiments disclosed herein may be used for a variety of applications. In one embodiment, a database owner may share a sample data set with new customer accounts for tutorials and/or introduction. In one embodiment, demo data sets may be shared from one account with demo accounts for demoing a data warehouse or other service to potential customers. In one embodiment, usage data collected by a database provider or host may be easily shared with customer accounts. In one embodiment, publicly available data sets may be shared from a central account with customer accounts so that customer accounts do not have to ingest the data themselves. In one embodiment, customers can share data with other customers for easier access to shared resources, without the need to physically copy or transmit the data. In one embodiment, customers can easily share data with an administrator for investigation of support issues. According to one embodiment, customers or other account holders/owners may list information about their data on a market place for purchase/subscription. For example, some embodiments provide a market place to buy and sell data sets between customer accounts of a multi-tenant database or data warehouse.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

Referring now to the figures, FIG. 1 is a schematic block diagram illustrating a multi-tenant database or data warehouse that supports many different customer accounts A1, A2, A3, An, etc. Customer accounts may be separated by multiple security controls, including different uniform resource locators (URLs) to connect to, different access credentials, different data storage locations (such as Amazon Web Services S3 buckets), and different account-level encryption keys. Thus, each customer may only be allowed to see, read, and/or write the customer's own data. By design it may be impossible for a customer to see, read, or write another customer's data. In some cases, strict separation of customer accounts is the backbone of a multi-tenant data warehouses or database system.

Figure 2:
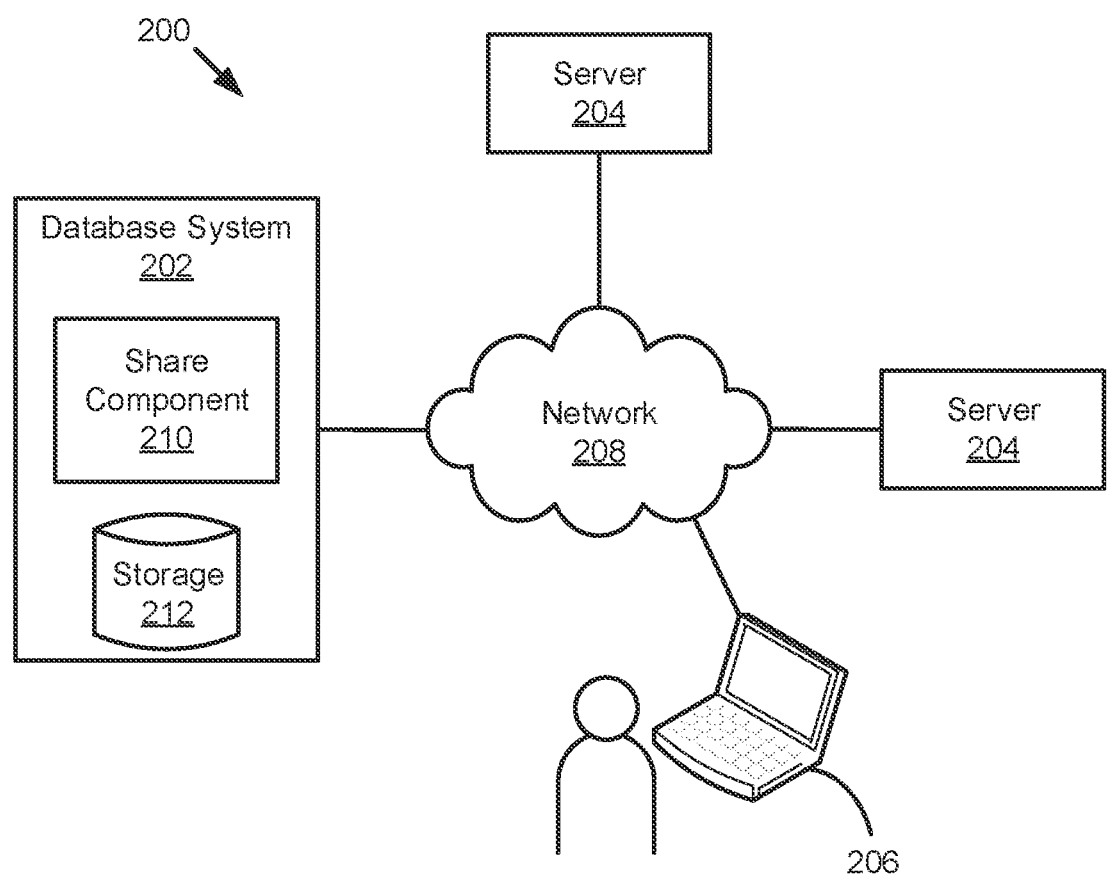
FIG. 2 is a schematic diagram illustrating a system for providing and accessing database services, according to one embodiment.

FIG. 2 is a schematic diagram of a system 200 for providing and accessing database data or services. The system 200 includes a database system 202, one or more servers 204, and a client computing system 206. The database system 202, the one or more servers 204, and/or the client computing system 206 may communicate with each other over a network 208, such as the Internet. For example, the one or more servers 204, and/or the client computing system 206 may access the database system 202 over the network 208 to query a database and/or receive data from a database. The data from the database may be used by the one or more servers 204 or client computing system 206 for any type of computing application. In one embodiment, the database system 202 is a multi-tenant database system hosting data for a plurality of different accounts.

The database system 202 includes a share component 210 and storage 212. The storage 212 may include storage media for storing data. For example, the storage 212 may include one or more storage devices for storing database tables, schemas, encryption keys, data files, or any other data. The share component 210 may include hardware and/or software for enabling the cross-account sharing of data or services and/or for associating view privileges with data or services. For example, the share component 210 may process queries/instructions received from remote devices to access shared data or share data. The queries/instructions may be received from the servers 204 or client computing system 206. In one embodiment, the share component 210 is configured to allow sharing data between accounts without creating duplicate copies of tables, data, or the like outside the sharing account. For example, the share component may allow for computer resources allocated to a sharing account to perform any queries or instructions provided by a foreign account.

In one embodiment, the share component 210 receives an indication from a client computing system 206 that an underlying detail of a share object should be associated with a secure user-defined function definition. The client may define a secure view using the SECURE keyword in CREATE VIEW, and the client may set or sunset the SECURE property on a view using an ALTER VIEW command. In an embodiment, the share component 210 is configured to carry out each of the client commands to define the secure view, and in an alternative embodiment the share component 210 is configured to automatically define a secure view based on, for example, previous settings received from the client computing system 206. To associate view privileges with an underlying detail of a share object, the share component 210 alters the parser to support the "secure" keyword before the view name and the new alter view rule. The view is effectively stored as a table, and the change involves altering the table data persistence object (DPO) and adding a "secure" flag to indicate that the view is a secure view (in addition to the view text now comprising the "secure" tag).

In an embodiment the share component 210 ensures that the secure user-defined function definition is hidden from users or client accounts that are not the owner of the view (or the underlying data). The share component 210 may ensure the secure user-defined function definition is hidden by changing the output of commands such that results will be returned as usual to the owner of a view but will not return the secure user-defined function definition to a non-owner who has access to the view.

In one embodiment, storage and compute resources for a database system 100 may be logically and/or physically separated. In one embodiment, storage is a common, shared resource across all accounts. Compute resources may be set up independently, per account, as virtual warehouses. In one embodiment, a virtual warehouse is a set of compute nodes that access data in a storage layer and compute a query result. Separating the compute nodes or resources from the storage allows scaling each layer independently. Separation of storage and compute also allows that shared data can be processed independently by different accounts, without the computation in one account affecting the computation in other accounts. That is, in at least some embodiments, there is no contention among computing resources when running queries on shared data.

Figure 3:
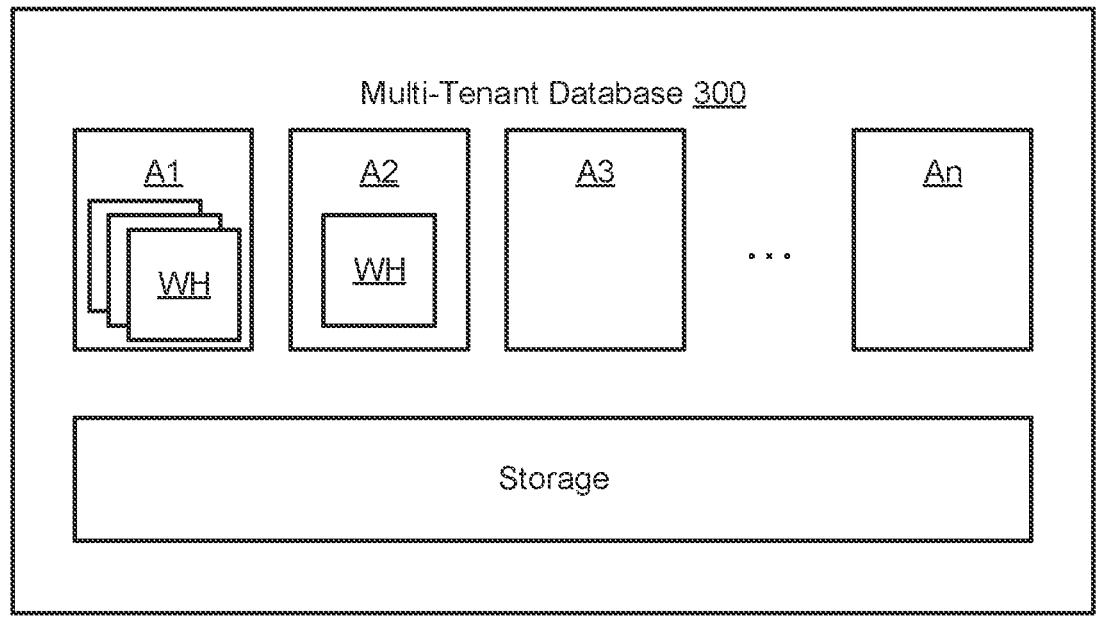
FIG. 3 is a schematic diagram illustrating a multi-tenant database with separation of storage and computing resources, according to one embodiment.

FIG. 3 is a schematic block diagram of a multi-tenant database 300 illustrating separation of storage and computing resources. For example, the multi-tenant database 300 may be a data warehouse where a plurality of different accounts (A1, A2, A3, through An) are hosted. In FIG. 3, account A1 has three virtual warehouses running, account A2 has one virtual warehouse running, and account A3 has no virtual warehouse running. In one embodiment, all these virtual warehouses have access to the storage layer that is separated from the compute nodes of the virtual warehouses. In one embodiment, virtual warehouses can be dynamically provisioned or removed based on a current workload for an account.

In one embodiment, a database system 300 uses object hierarchies in accounts. For example, each customer account may contain object hierarchies. Object hierarchies are often rooted in databases. For example, databases may contain schemas and schemas, in turn, may contain objects such as tables, views, sequences, file formats, and functions. Each of these objects serves a special purpose: tables store relational or semi-structured data; views define logical abstractions over the stored data; sequences provide means to generate ever-increasing numbers; file formats define ways to parse ingested data files; and functions hold user-defined execution procedures. In embodiments as disclosed herein, views may be associated with secure user-defined function definitions such that underlying data associated with the view is hidden from non-owner accounts who have access to the view.

Figure 4:
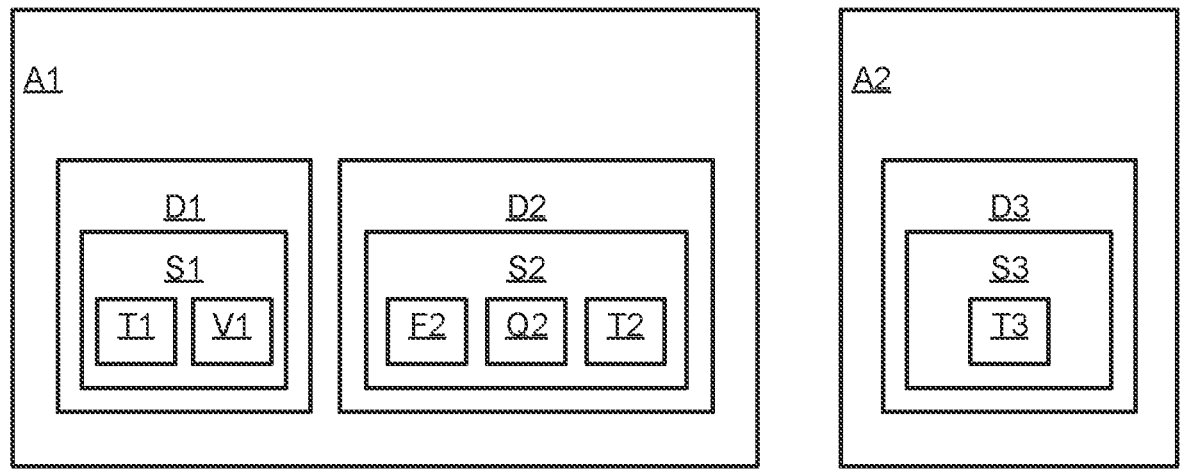
FIG. 4 is a schematic block diagram illustrating object hierarchies, according to one embodiment.

FIG. 4 is a schematic block diagram illustrating object hierarchies within customer accounts. Specifically, accounts may include hierarchies of objects which may be referenced in a database. For example, customer account A1 contains two databases objects D1 and D2. Database object D1 contains schema object S1, which in turn contains table object T1 and view object V1. Database object D2 contains schema object S2, which contains function object F2, sequence object Q2, and table object T2. Customer account A2 contains a database object D3 with schema object S3 and table object T3. The object hierarchies may control how objects, data, functions, or other information or services of an account or database system are accessed or referenced.

In one embodiment, a database system implements role-based access control to govern access to objects in customer accounts. In general, role-based access control consists of two basic principles: roles and grants. In one embodiment, roles are special objects in a customer account that are assigned to users. Grants between roles and database objects define what privileges a role has on these objects. For example, a role that has a usage grant on a database can "see" this database when executing the command "show databases"; a role that has a select grant on a table can read from this table but not write to the table. The role would need to have a modify grant on the table to be able to write to it.

Figure 5:
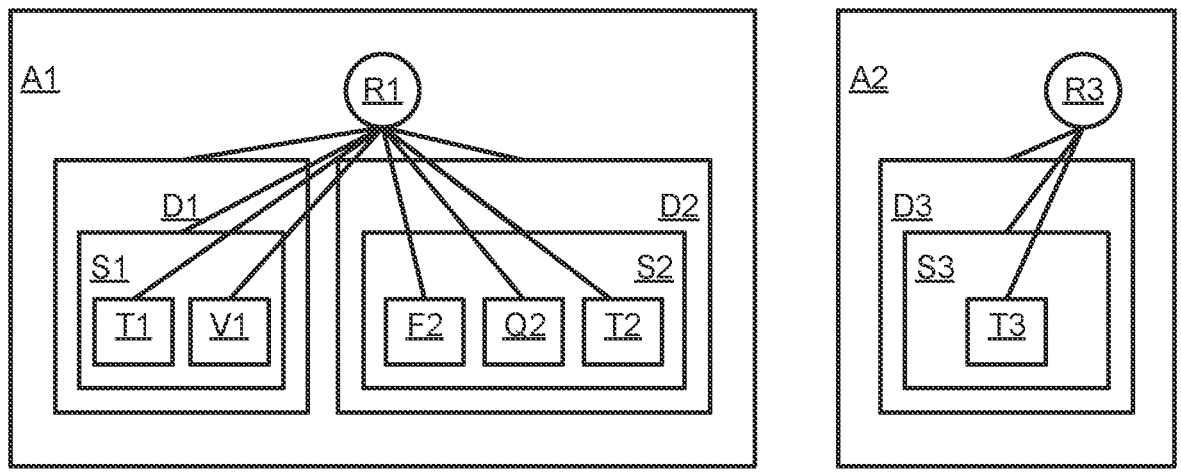
FIG. 5 is a schematic diagram illustrating role-based access, according to one embodiment.

FIG. 5 is a schematic block diagram illustrating role-based access to objects in customer accounts. A customer account A1 contains role R1, which has grants to all objects in the object hierarchy. Assuming these grants are usage grants between R1 and D1, D2, S1, S2 and select grants between R1 and T1, V1, F2, Q2, T2, a user with activated role R1 can see all objects and read data from all tables, views, and sequences and can execute function F2 within account A1. Customer account A2 contains role R3, which has grants to all objects in the object hierarchy. Assuming these grants are usage grants between R3 and D3, S3, and select a grant between R3 and T3, a user with activated role R3 can see all objects and read data from all tables, views, and sequences within account A2.

Figure 6:
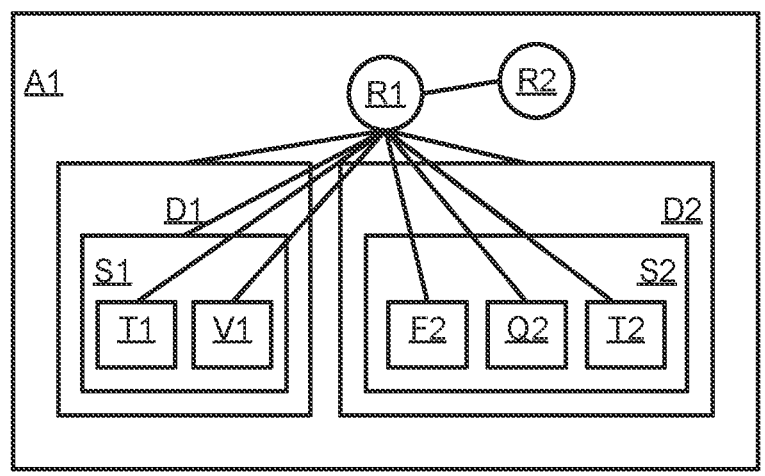
FIG. 6 is a schematic diagram illustrating a usage grant between roles, according to one embodiment.

FIG. 6 illustrates a usage grant between roles. With role-based access control, it is also possible to grant usage from one role to another role. A role that has a usage grant to another role "inherits" all access privileges of the other role. For example, in role R2 has a usage grant on role R1. A user (e.g., with corresponding authorization details) with activated role R2 can see and read from all objects because role R2 inherits all grants from role R1.

According to one embodiment, usage grants are granted across different accounts. An account that shares data may be referred to herein as a "sharer account" and an account with which the data is shared may be referred to herein as a "target account". In one embodiment, embodiments disclosed herein allow for instantaneous, zero-copy, easy-controllable cross-account sharing of data that may implement secure user-defined function definitions such that the target account cannot view underlying details or view definitions of the view. In one embodiment, to share data with another account, a sharer account may generate a share object. Within the share object, a role may be created, and a user of the sharer account may indicate access rights or grants are available to the role and/or foreign (or target accounts) that will be granted rights under the role. A view privilege may be associated with an underlying detail of the share object such as, for example, a data field of an underlying database table, a quantity of data within the database table, and/or a structural element of an underlying database table of the share object. The view privilege may indicate a secure user-defined function definition indicating that the target account does not have access to the underlying detail of the share object. A target account may then be able to identify share objects or roles in other account to which the target account has been granted rights or access. In one embodiment, share objects in a sharer account may be imported into the target account using alias objects and cross-account role grants. In one embodiment, such share objects may be imported into the target account as a secure view such that one or more underlying details of the share object are hidden from the target account.

In one embodiment, data sharing is initiated by the account that owns the data to be shared. For example, the sharer account creates a new type of object, the share object. The share object has a unique name to be identified within the sharer account. For example, the name may need to be unique within an account, but not necessarily across accounts. Share objects may be created, modified, and deleted by referencing them via their name in the sharer account.

In one embodiment, each share object contains a single role. Grants between this role and objects define what objects are being shared and with what privileges these objects are shared. The role and grants may be similar to any other role and grant system in the implementation of role-based access control. By modifying the set of grants attached to the role in a share objects, more objects may be shared (by adding grants to the role), fewer objects may be shared (by revoking grants from the role), or objects may be shared with different privileges (by changing the type of grant, for example to allow write access to a shared table object that was previously read-only).

In one embodiment, a share objects also contains a list of references to other customer accounts. Only these accounts that are specifically in the share object may be allowed to look up, access, and/or import from this share object. By modifying the list of references of other customer accounts, the share object can be made accessible to more accounts or be restricted to fewer accounts.

In one embodiment, secure view processing is implemented through transformations of the parse tree e.g. view merging and predicate transformation. The canonical implementation would be to annotate query blocks such that the query blocks are designated as coming from secure views. In such a case, the query blocks cannot be combined with external query blocks (e.g. via view merging) or expressions (e.g. via filter pushdown).

In one embodiment, secure view processing is implemented through rewrites of the query plan tree during optimization e.g. during filter pullup and filter pushdown. The query plan tree rewrites are implemented such that no expression not stemming from a secure view can be pushed down below the view boundaries. This may be implemented by generating a new type of projection operator (e.g. secure-projection operator) that behaves identically to a standard projection but, since it is not a standard projection, fails to match any of the rewrite rule preconditions. As a result, the relevant rewrites are not applied. Identifying what type of projection is to be generated i.e. a standard or secure one, may be implemented after view query blocks are designated as coming from a secure user-defined function definition or not.

In one embodiment, optimizations for secure views are implemented to mitigate a potential loss of performance that is historically associated with the use of secure views. Such optimizations are implemented by deeming certain transformations as "safe" in that the transformation does not represent a potential cause for concern. Safety in such an instance means that the operations being transformed will not have any side effects that typically refer to a user-defined function that performs operations that cannot readily be identified as unsafe from SQL, or operations that can potentially fail revealing information about the data value that caused the failure e.g. when dividing by zero. As a result, optimizations include annotating expressions with their safety properties and then enabling transformations that allow an expression to be pushed through a secure view boundary if they are deemed safe. The expression is deemed safe if the expression is known to produce no errors and contains no user-defined functions. Whether the expression produces errors is determined using a framework configured to determine whether an expression may generator an error at runtime depending on the type of expression and the properties of its inputs (i.e. whether the inputs produce errors). In certain implementations it may be important to ensure the expression contains no user-defined functions because, even if a user-defined function never produces an error, it can capture state from rows that should be filtered out from user results and leak that state in rows that are not filtered out.

In an embodiment, further optimizations include optimizing a secure view as if it were a non-secure view. This may be implemented if the current role has access to all underlying details (e.g. underlying tables, underlying data fields, underlying database structures, underlying views, etc.) referenced within the share object.

Additionally, the use of secure views in data sharing may be optimized by permitting filter pullup through secure projections. Filter pullup may be useful for subquery rewrites and may further be useful for transitive predicate generation where filters are pulled up through a join and when pushed back down through the join, the filters can potentially be pushed to both sides of the join. The filter pullup may be implemented by copying the filter on pullup through the secure projection such that the original predicate remains below the secure projection to ensure that all security-related filtering occurs before any expression evaluation outside of the view. The pulled up copy of the predicate can be utilized for pullup-related optimizations.

Additionally, the use of outer join to inner join conversion below secure projections may be utilized to optimize the use of secure views in data sharing. The outer join to inner join conversion includes a filter predicate appearing immediately above a join, wherein the filter predicate filters out nulls from the null-extended side of the outer join. If a secure view includes an outer join, and a user filter filters out nulls, then the filter may not be pushed all the way to the join if it is not a safe-to-push filter. The optimization further includes propagating the fact that nulls may be filtered out without moving the filter through the secure projection.

Figure 7:
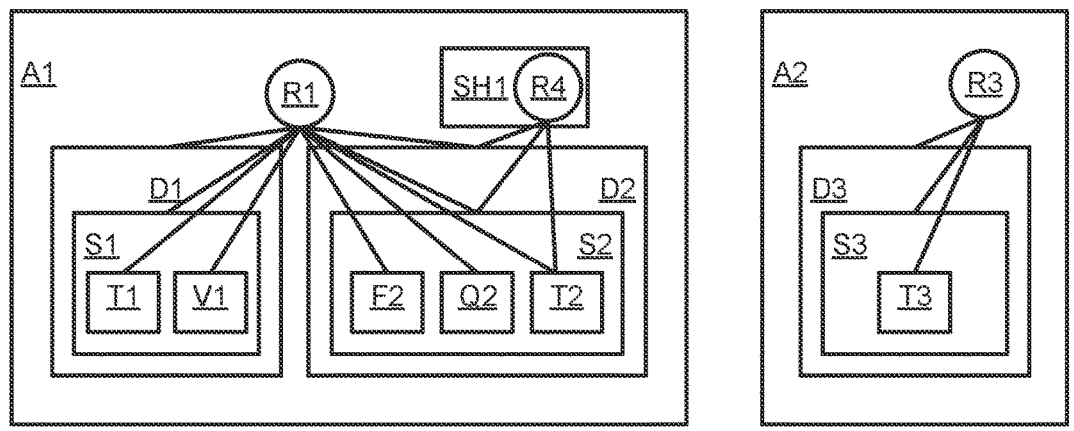
FIG. 7 is a schematic diagram illustrating a share object, according to one embodiment.

FIG. 7 is a schematic block diagram illustrating a share object SH1. Customer account A1 contains share object SH1. Share object SH1 has a unique name "SH1" in customer account A1. Share object SH1 contains role R4 with grants to database D2, schema S2, and table T2. The grants on database D2 and schema S2 may be usage grants and the grant on table T2 may be a select grant. In this case, table T2 in schema S2 in database D2 would be shared read-only. Share object SH1 contains a list of references to other customer accounts, including account A2.

After a share object is created, the share object may be imported or referenced by a target account listed in the share object. For example, importing a share object from a sharer account is possible from other customer accounts. A target account may run a command to list all available share objects for importing. Only if a share object was created with references that included the target account, the target account may list the share object and subsequently import it. In one embodiment, references to a share object in another account are always qualified by account name. For example, target account A2 would reference share SH1 in sharer account A1 with the example qualified name "A1.SH1".

In one embodiment, a process or importing a share object may include: creating an alias object in the target account; linking the alias object with the top-most shared object in the sharer account in the object hierarchy; granting a role in the target account usage privileges to the alias object; and granting the target account role usage privileges to the role contained in the share object.

In one embodiment, a target account that imports the share object or data creates an alias object. An alias object is similar to a normal object in a customer account. An alias object has its own unique name with which it is identified. An alias object may be linked to the top-most object in each object hierarchy that is shared. If multiple object hierarchies are shared, multiple alias objects may be created in the target account. Whenever an alias object is used (e.g., reading from the alias object, writing to the alias object), the alias object is internally replaced by the normal object in the sharer account to which it links. This way, alias objects are merely proxy objects of normal objects, and not duplicate objects. Thus, when reading from or writing to an alias object, the operations affect the original object that the alias links to. Like normal objects, when an alias object is created it is granted to the activated role of the user.

In addition to the alias object, a grant between a role in the target account and the role contained in the share object is created. This is a usage grant from role to role across customer accounts. Role-based access control now allows a user in the target account to access objects in the sharer account.

Figure 8:
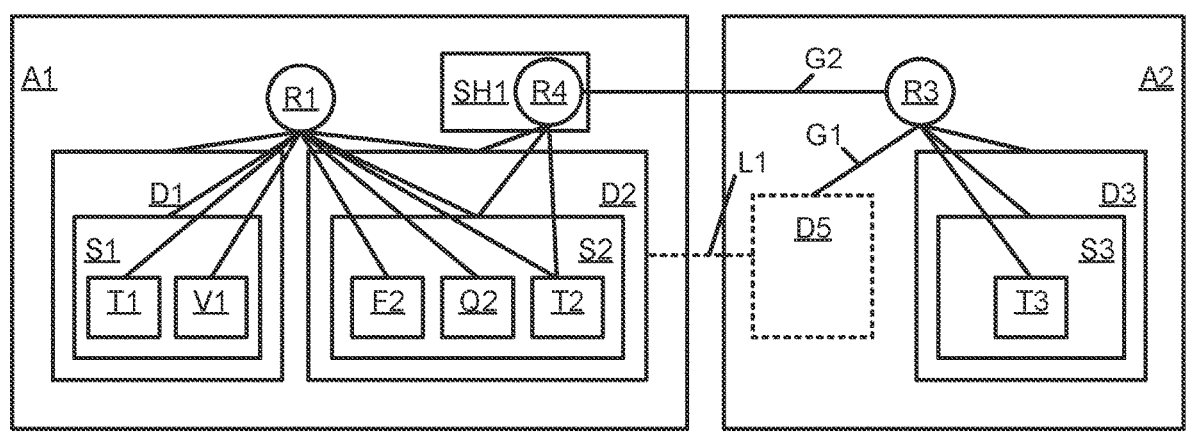
FIG. 8 is a schematic diagram illustrating cross-account grants, according to one embodiment.

FIG. 8 is a schematic block diagram illustrating logical grants and links between different accounts. A database alias object D5 is created in account A2. Database alias D5 references database D2 via link L1. Role R3 has a usage grant G1 on database D5. Role R3 has a second usage grant G2 to role R4 in customer account A1. Grant G2 is a cross-account grant between accounts A1 and A2. In one embodiment, role-based access control allows a user in account A2 with activated role R3 to access data in account A1. For example, if a user in account A2 wants to read data in table T2, role-based access control allows that because role R3 has a usage grant of role R4 and role R4, in turn, has a select grant on table T2. By way of illustration, a user with activated role R3 may access T2 by running a query or selection directed to "D5.S2.T2".

Using object aliases and cross-account grants from a role in the target account to a role in the sharer account allows users in the target account to access information in the sharer account. In this way, a database system may enable sharing of data between different customer accounts in an instantaneous, zero-copy, easy-controllable fashion. The sharing can be instantaneous because alias objects and cross-account grants can be created in milliseconds. The sharing can be zero-copy because no data must be duplicated in the process. For example, all queries, or selections can be made directly to the shared object in the sharer account without creating a duplicate in the target account. The sharing is also easy to control because it utilizes easy-to-use techniques of role-based access control. Additionally, in embodiments with separated storage and compute, there is no contention among computing resources when executing queries on shared data. Thus, different virtual warehouses in different customer accounts may individually process shared data. For example, a first virtual warehouse for a first account may process a database query or statement using data shared by a sharer account and a second virtual warehouse for a second account, or the sharer account, may process a database query or statement using the shared data of the sharer account.

Figure 9:
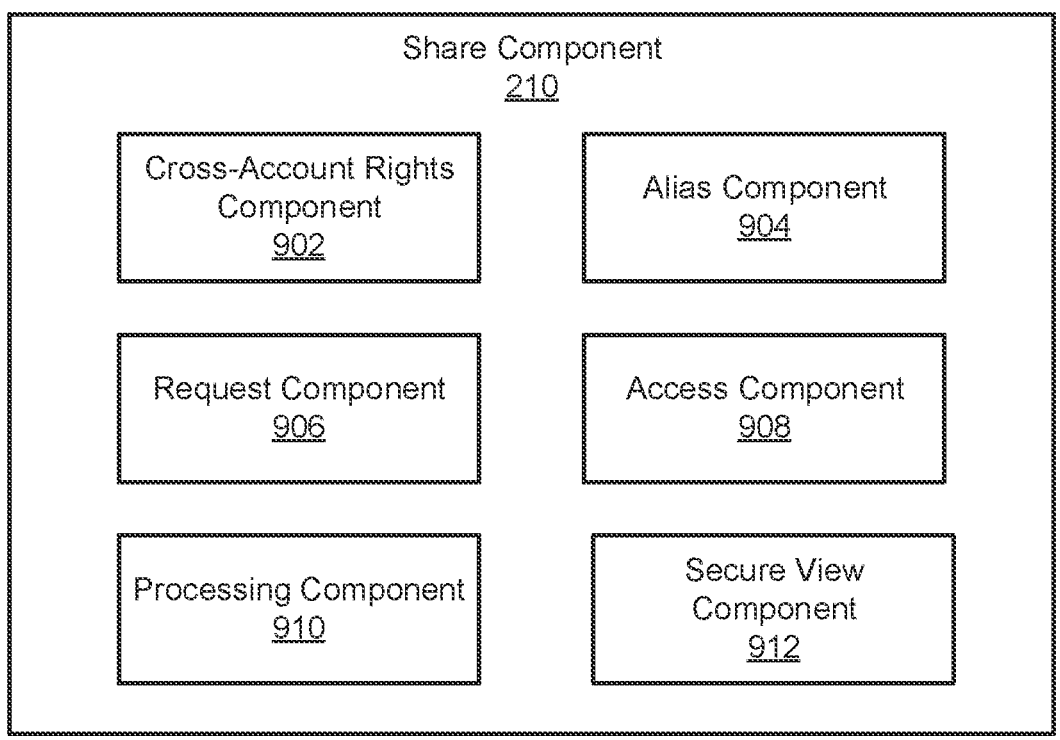
FIG. 9 is a schematic block diagram illustrating components of a share component, according to one embodiment.

FIG. 9 is a schematic block diagram of a share component 210. The share component 210 includes a cross-account rights component 902, an alias component 904, a request component 906, an access component 908, a processing component 910, and a secure view component 912. The components 902-912 are given by way of example only and may not all be included in all embodiments. For example, each of the components 902-912 may be included in or may be implemented as part of a separate device or system.

The cross-account rights component 902 is configured to create and manage rights or grants between accounts. The cross-account rights component 902 may generate a share object in a sharer account. For example, a user of the sharer account may provide input indicating that one or more resources should be shared with another account. In one embodiment, the user may select an option to create a new share object so that resources can be shared with foreign accounts. In response to the user input, the cross-account rights component 902 may create a share object in the sharer account. The share object may include a role to which access rights can be granted to resources for sharing with a foreign account. The foreign account may include a customer account or other account that is separate from the sharer account. For example, the foreign account may be another account hosted on a multi-tenant database system.

Upon creation, the share object may be granted rights to one or more resources within the sharer account. The resources may include a database, a schema, a table, a sequence, or a function of the sharer account. For example, the share object may contain a role (i.e., share role) which is granted right to read, select, query, or modify a data storage object, such as a database. The share object, or share role in the share object, may be granted rights similar to how rights may be granted to other roles using role-based access control. A user may be able to access an account and grant rights to the share role so that the share role can access resources that are meant to be shared with foreign accounts. In one embodiment, the share object may include a list of objects, and an access level, for which the share role has rights.

The share object may also be made available or linked to specific foreign accounts. For example, the share object may store a list of accounts that have rights to the share role or share object in the sharer account. A user with the sharer account may add or remove accounts to the list of accounts. For example, the user may be able to modify the list to control which accounts can access objects shared via the share object. Foreign accounts listed or identified in the share object may be given access to resources with access rights granted to a share role of the share object. In one embodiment, a specific account can perform a search to identify share objects or sharer accounts that have been shared with the specific account. A list of available share objects can be viewed by a user of the target or specific account.

The alias component 904 is configured to generate an alias for data or a data object shared by a separate account. For example, the alias object may create, in a target account, an alias object corresponding to a shared resource shared by a sharer account. In one embodiment, the alias object is created in response to a target account accepting a shared resource or trying to access a shared resource for the first time. The alias object may act as an alias for a data object for the highest object hierarchy shared by the sharer account (see, e.g., FIG. 8 where D5 is an alias for D2). The alias component 904 may also generate a link between the alias object and a shared object (see, e.g., FIG. 8 where L1 is the link between D5 and D2). The link may be created and/or stored in the form of an identifier or name of the original or "real" object. For example, the link L1 in FIG. 8 may include an identifier for D2 stored in the alias object D5 that includes a unique system wide name, such as "A1. D2".

The alias component 904 may also grant a role in the target account (the account with which the sharer account has shared data or resources) access rights to the alias object (see, e.g., G1 of FIG. 8). Additionally, the alias component 904 may also grant the role in the target account to a share role in the share object of the sharer account (see, e.g., G2 of FIG. 8). With the alias object created, a link between the alias object and an object in the sharer account, and grants to a role in the target account, the target account may be free to run queries, statements, or "see" shared data or resources in the sharer account.

The request component 906 is configured to receive a request from an account to access a shared resource in a different account. The request may include a database query, select statement, or the like to access a resource. In one embodiment, the request includes a request directed to an alias object of the requesting account. The request component 906 may identify a resource with which the alias object is linked, such as a database or table in a sharer account. The request component 906 may identify the linked object based on an identifier of the alias object.

The access component 908 is configured to determine whether an account has access to a shared resource of a different account. For example, if a first account requests access to a resource of a different, second account, the access component 908 may determine whether the second account has granted access to the first account. The access component 908 may determine whether a requesting account has access by determining whether a share object identifies the requesting account. For example, the access component 908 may check if the requesting account is present in a list of accounts stored by a share object. The access component 908 may also check whether the share object that identifies the requesting account has access rights (e.g., grants) to the targeted data resource in the sharer account.

In one embodiment, the access component 908 may check for the presence of a grant from a share role in a sharer account to a requesting role in the requesting account. The access component 908 may check whether a link exists between an alias object to which a database request or statement was directed or whether a grant exists between a requesting role and the alias object. For example, the access component 908 may check for the existence or presence of one or more of L1, G1 and G2 illustrated in FIG. 8. Furthermore, the access component 908 may check for a grant between a role in a share object to an object (such as a table or database) of the sharer account. For example, the access component 908 may check for the existence of a grant between the role R4 and the database D2 in FIG. 8. If the access component 908 determines that the requesting account has access to the shared resource, the request may be fulfilled by the share component 210 or a processing component 910. If the access component 908 determines that the requesting account does not have rights to the requested data or object, the request will be denied.

The processing component 910 is configured to process database requests, queries, or statements. The processing component 910 may process and provide a response to a request from an account to access or use data or services in another account. In one embodiment, the processing component 910 provides a response to a request by processing the request using original data in a sharer account that is different from the requesting account. For example, the request may be directed toward a database or table stored in or for a first account and the processing component 910 may process the request using the database or table of the first account and return a response to a requesting, second account.

In one embodiment, the processing component 910 performs processing of shared data without creating a duplicate table or other data source in the requesting account. Generally, data must be first ingested into an account that wishes to process that data or perform operations against the data. The processing component 910 may save processing time, delay, and/or memory resources by allowing a target account to access shared resources in a sharer account without creating a copy of a data resource in the target account.

The processing component 910 may perform processing of the same data using different processing resources for different accounts. For example, a first virtual warehouse for a first account may process a database query or statement using data shared by a sharer account and a second virtual warehouse for a second account, or the sharer account, may process a database query or statement using the shared data of the sharer account. Using separate processing resources to process the same data may prevent contention for processing resources between accounts. The processing resources may include dynamically provisioned processing resources. In one embodiment, processing of shared data is performed using a virtual warehouse for the requesting account even though the data may be in storage for a different account.

The secure view component 912 is configured to define a secure view for a share object, a data field of a share object, a data field of a database object, and so forth. In an embodiment, the secure view component 912 defines the secure view using a SECURE keyword in a view field and may set or unset the SECURE property on a view using an ALTER VIEW command. In various embodiments, the secure view component 912 may implement such commands only at the manual direction of a client account or may be configured to automatically implement such commands. The secure view component 912 may alter the parser to support the secure keyword before the view name and the new alter view rule. In an embodiment, the alter view rule may be more general to incorporate further view-level attributes. In terms of metadata support, the vies may effectively be stored as tables, and the change may involve altering a table data persistence object that includes a secure flag indicating whether the view is a secure view (this may be implemented in addition to the view text comprising the secure tag). The secure user-defined function definition (i.e. the table data persistence object) may be hidden from users that are not the owner of the view. In such an embodiment, a command to show views will return results as usual to the owner of the view but will not return the secure user-defined function definition to a non-owner second account that has access to the view.

The secure view component 912 may alter transformations of a parse tree, e.g. view merging and predicate information. The canonical implementation may include annotating query blocks such that the query blocks are designated as coming from secure view. In such an implementation, the query blocks cannot be combined with external query blocks (e.g. view merging) or expressions (e.g. via filter pushdown).

The secure view component 912 may rewrite the query plan tree during optimization e.g. during filter pullup and/or filter pushdown. The secure view component 912 may be configured to ensure that no expression that does not stem from a secure view can be pushed down below the view boundaries. The secure view component 912 may be configured to achieve this by implementing a new type of projection that behaves identically to a standard projection but, since it is not a standard projection, fails to match any of the rewrite rule preconditions. As a result, the relevant rewrites are not applied. The secure view component 912 may be configured to identify what type of projection is to be generated (e.g. a standard projection or a secure projection) after query blocks have been designated as coming from a secure user-defined function definition or not.

The secure view component 912 is configured to optimize performance for secure views in a zero-copy data sharing system. In various embodiments known in the art, secure views are known to cause a loss of performance that may effectively cripple the optimizer from applying certain transformations. Such embodiments might be improved by deeming certain transformations as safe, where safety indicates that the operations being transformed will not have any side effects on the system. Such side effects may be caused by a user defined function (UDF) that performs operations that cannot readily identify unsafe operations, or operations that can fail and reveal information about the data value that caused the failure (e.g. when dividing by zero or some similar operation). The secure view component 912 may annotate expressions with the expression's safety properties and then enable transformations that allow an expression to be pushed through a secure view boundary if the expression is deemed safe. The expression may be deemed safe if the expression is known to produce no errors and the expression does not contain a user defined function (UDF). The secure view component 912 may determine whether the expression produces errors by utilizing an expression properties framework where the expression properties store an indication whether an expression may produce errors.

Figure 10:
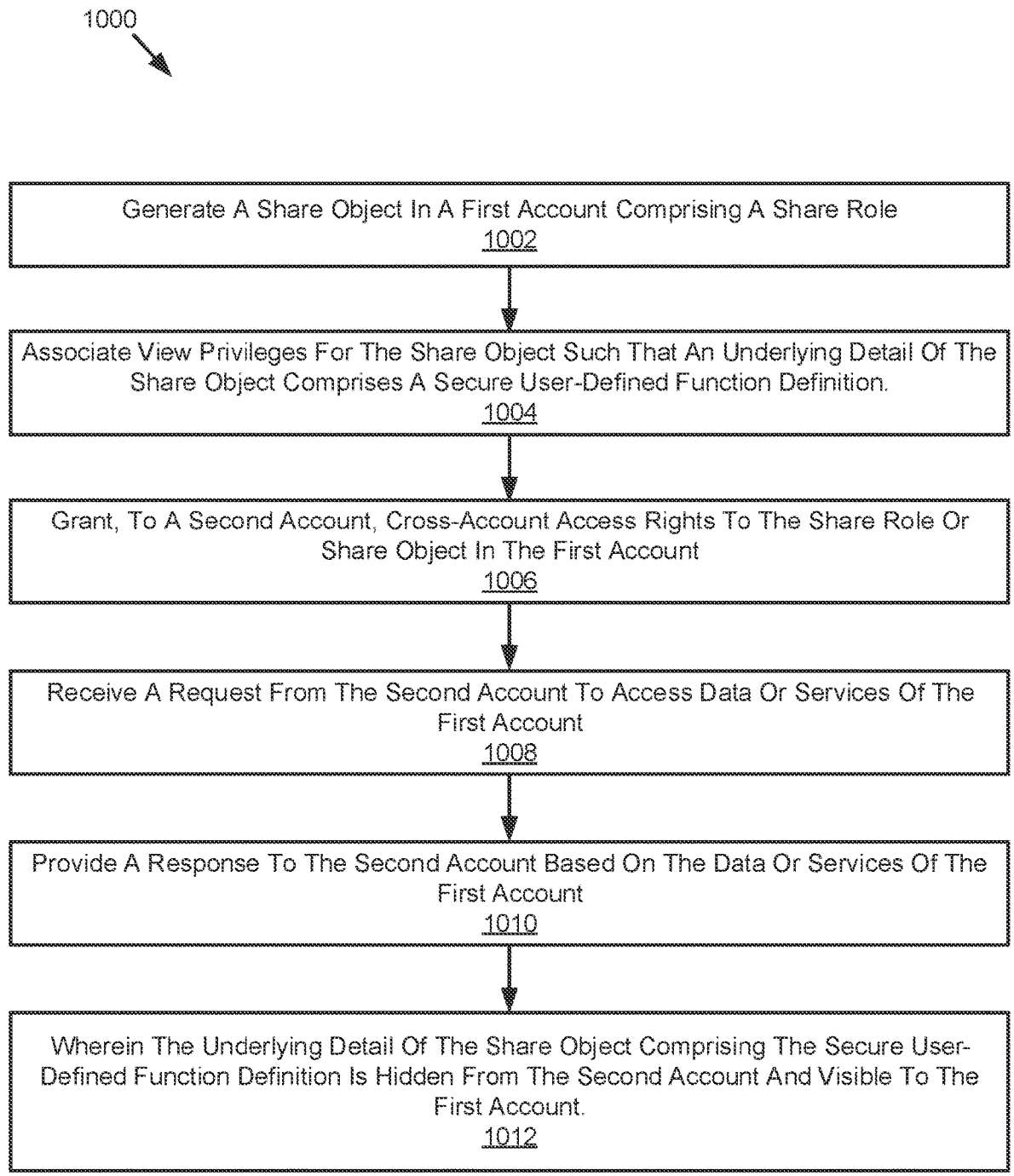
FIG. 10 is a schematic flow chart diagram illustrating a method for utilizing secure views when sharing database data between accounts, according to one embodiment.

FIG. 10 is a schematic flow chart diagram illustrating an example method 1000 for implementing secure views in zero-copy data sharing in a multi-tenant database system. The method 1000 may be performed by a database system, such as by a share component 210 as in FIG. 1 or 9 or by a database system as in FIG. 1, 2, or 3.

The method 1000 begins and a cross-account rights component 902 generates at 1002 a share object in a first account comprising a share role. The secure views component 912 associates at 1004 view privileges for the share object such that an underlying detail of the share object comprises a secure user-defined function definition. The underlying detail of the share object may comprise one or more of a data fields of an underlying database table, a structural element of an underlying database table, a quantity of data in an underlying database table, and so forth. The cross-account rights component 902 grants at 1006, to a second account, cross-account access rights to the share role or share object in the first account. A request component 906 receives at 1008 a request from the second account to access data or services of the first account. A processing component 910 provides at 1010 a response to the second account based on the data or services of the first account. The method is such that the data field of the share object comprising the secure user-defined function definition is hidden from the second account and visible to the first account (see 1012).

Figure 11:
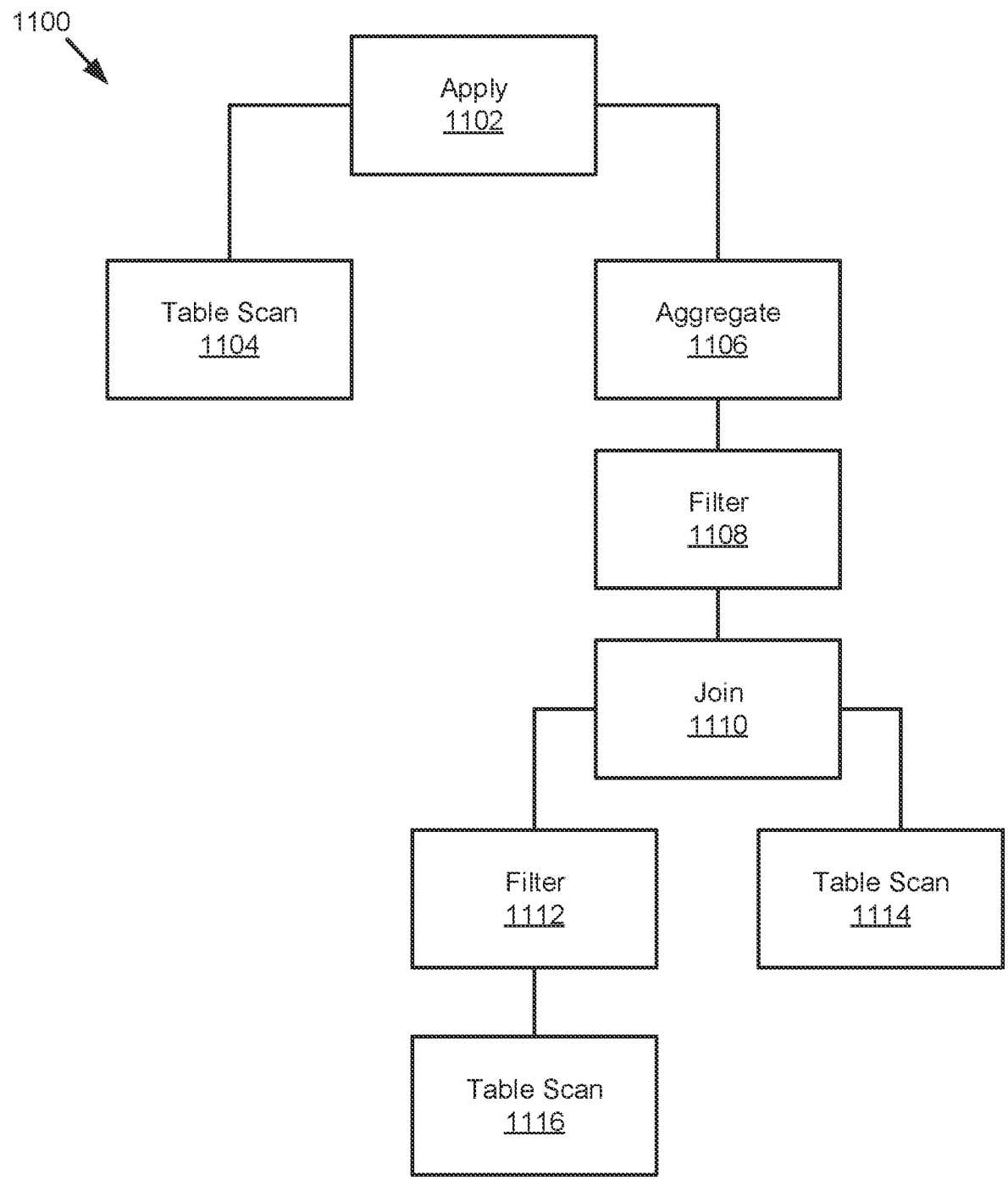
FIG. 11 is a schematic block diagram illustrating a process flow for a query plan utilizing a secure user-defined function, according to one embodiment.

FIG. 11 illustrates a process flow 1100 for a query plan utilizing a secure user-defined function (UDF). In an embodiment including UDFs, a client account may define a secure UDF. The definition of the secure UDF may be hidden from users that are not the owner of the function. In an embodiment, this requires changes to several operations. For example, a "SHOW FUNCTIONS" operation will return results as usual to the owner of the function but will not return the function definition to a non-owner that has access to the view. Further for example, a "GET DDL" operation will not return the DDL for a secure function to a non-owner. Further for example, an "INFORMATION SCHEMA FUNCTIONS" operation will only return the function definition to users with the owner role.

In an embodiment, Javascript UDFs do not require any changes to processing. In an embodiment for SQL UDFs accessing database tables, methods and system may ensure that no optimizations allow potentially dangerous user expressions to be evaluated before any filtering that occurs in the UDF which may arise from filter predicates or joins. Secure view may achieve this by introducing a "SecureProjection" node above the view's plan in the query plan tree and preventing potentially dangerous user expressions from being pushed through the SecureProjection. In an embodiment where existing optimizer rewrites do not know what a SecureProjection node is, the node may disable all optimizations that might move expressions into the view's plan. In an embodiment, only safe optimization that is added back may move anything through this barrier.

In an embodiment, secure UDFs differ in two ways from secure views. First, for secure UDFs, the barrier on top of the plan approach may not work because decorrelation rules may fail in the presence of the SecureProjection node. In an embodiment where decorrelation fails, the query cannot be evaluated. Second, in the case of a correlated UDF, dangerous user expressions can be pushed into the UDF from above (similar to views) or from the "left" i.e. the portion of the query where the correlation originates from.

In an embodiment, correlated subqueries and views are represented in a plan tree utilizing an Apply node. Semantically, the Apply node evaluates the correlated expression of the right-hand input on each row of the left-hand input and returns all rows returned from the right side. Scalar correlated subqueries and correlated view are converted to ultimately convert Apply to a Join. Where evaluation of Apply is not supported at runtime, a query that does not successfully remove all correlations (and convert Apply to Join) will fail with a user error. Decorrelation may be achieved through a set of rewrite rules that roughly correspond to the tree up above the Apply until the tree under the Apply is no longer correlated to the left-hand side. This pulling up of nodes may cause the use of a secure view approach of placing a SecureProjection on top of the function's tree to not work. In an embodiment, placing a SecureProjection above the Apply may not interfere with decorrelation rules but will not prevent user expressions from the left of the Apply from moving into the UDF.

Returning to FIG. 11, the process flow 1100 illustrates an example of decorrelation of a table-valued UDF. The process flow 1100 (before decorrelation) includes an apply 1102 leading to a table scan 1104 and an aggregate 1106. The aggregate 1108 leads to a filter 1108 operation and a join 1110 operation. The join 1110 operation leads to a filter 1112 and table scan 1116 operation and also to a table scan 1114 operation. In a process flow 1100 as illustrated in FIG. 11, the query is transformed by two decorrelation rules to remove the Apply 1102 node. The first rule moves a non-scalar Aggregate 1106 node above Apply 1102.

Figure 12:
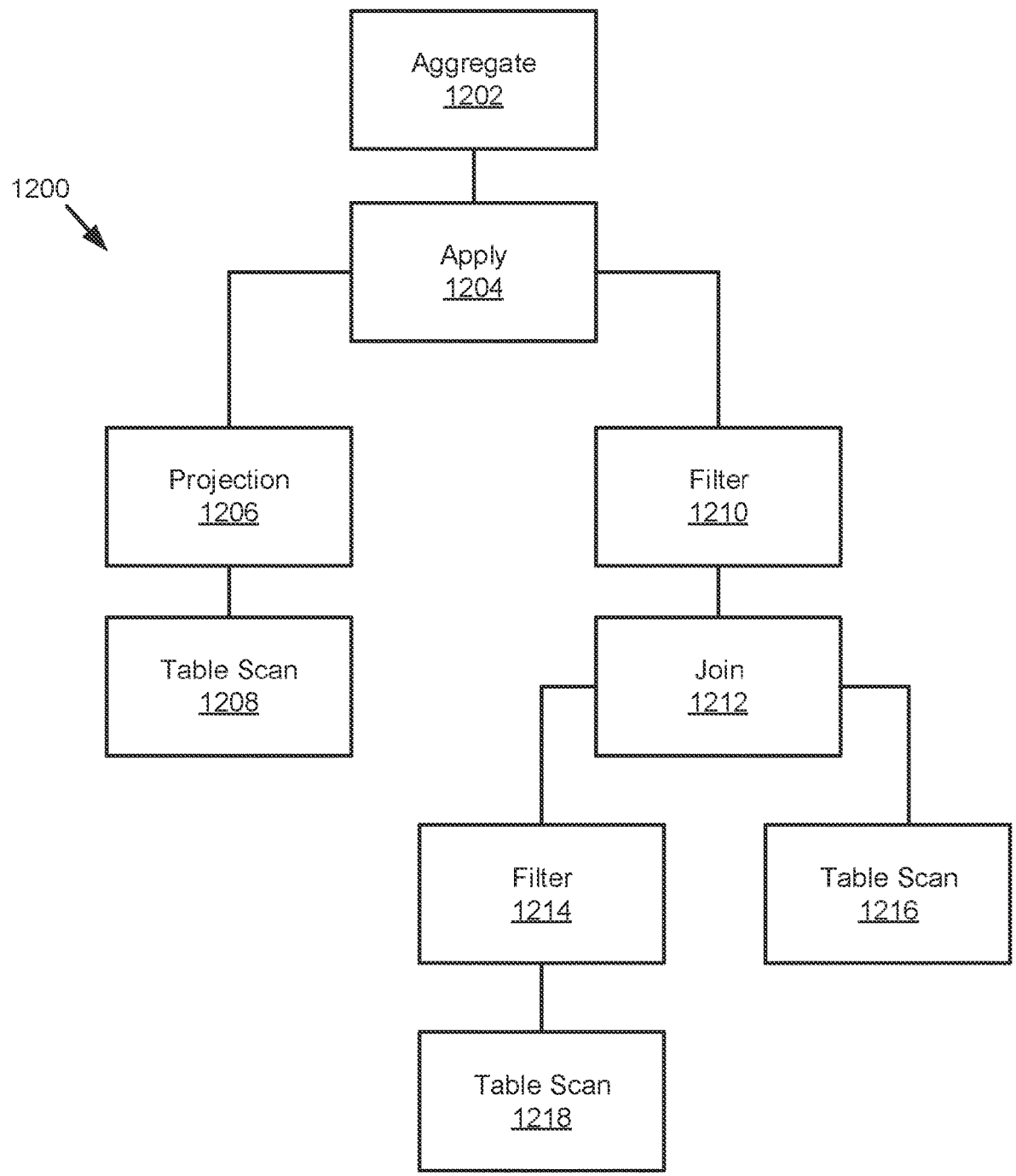
FIG. 12 is a schematic block diagram illustrating a process flow for a query plan utilizing a secure user-defined function, according to one embodiment.

FIG. 12 illustrates a process flow 1200 where a second rule converts an Apply node plus a correlated filter on the right side into a Join. The process flow 1200 includes an aggregate 1202 operation leading to the apply 1204. The apply 1204 flows to a projection 1206 and table scan 1208 and further leads to a filter 1210 operation. The filter 1210 leads to a join 1212 that flows to a filter 1214 and table scan 1218 or alternatively to a table scan 1216.

Figure 13:
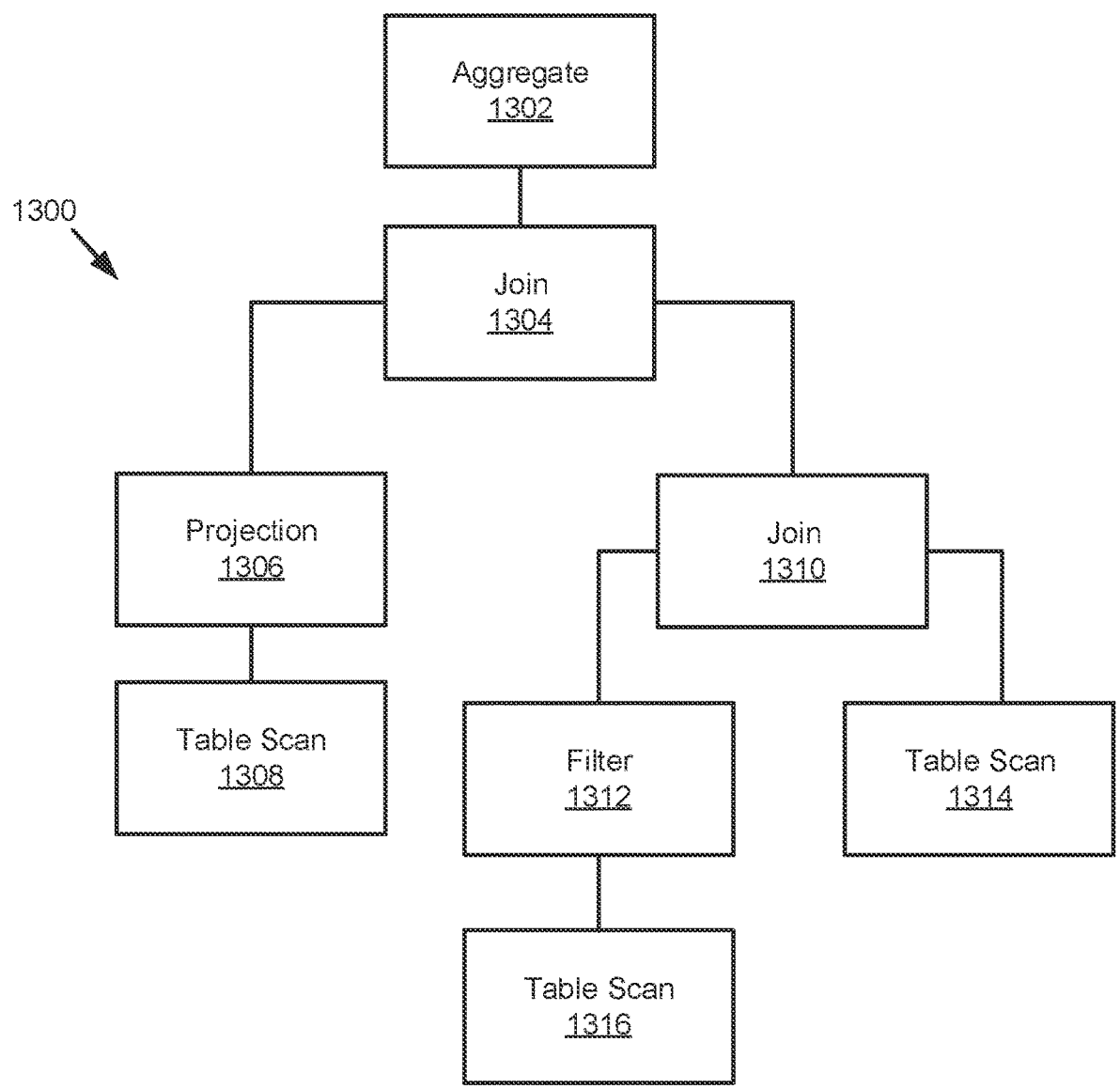
FIG. 13 is a schematic block diagram illustrating a process flow for a query plan utilizing a secure user-defined function, according to one embodiment.

FIG. 13 illustrates a process flow 1300 for exposing data from a table-valued UDF. In an embodiment, to make a UDF secure, potentially unsafe expressions must be prevented from moving above the Apply or from the left side of the Apply to the right side of the Apply. In the process flow 1300 illustrated in FIG. 13, the aggregate 1302 leads to a join 1304 and the join 1304 leads to a projection 1306 and table scan 1308 and alternatively leads to a join 1310. The join 1310 leads to a filter 1312 and table scan 1316 or alternatively to a table scan 1314.

In an embodiment illustrated in FIG. 13, the table function is intended to expose data only for employees from, for example, one department of an employee database. In one example, the query may be utilized to determine if there are any employees within a specific salary range in a database. If there is an employee with a salary greater than a defined threshold, the query will generate an error. This may occur due to a filter predicate pushdown. After the Apply is converted to a Join, the filter may be pushed below the two joins.

Figure 14:
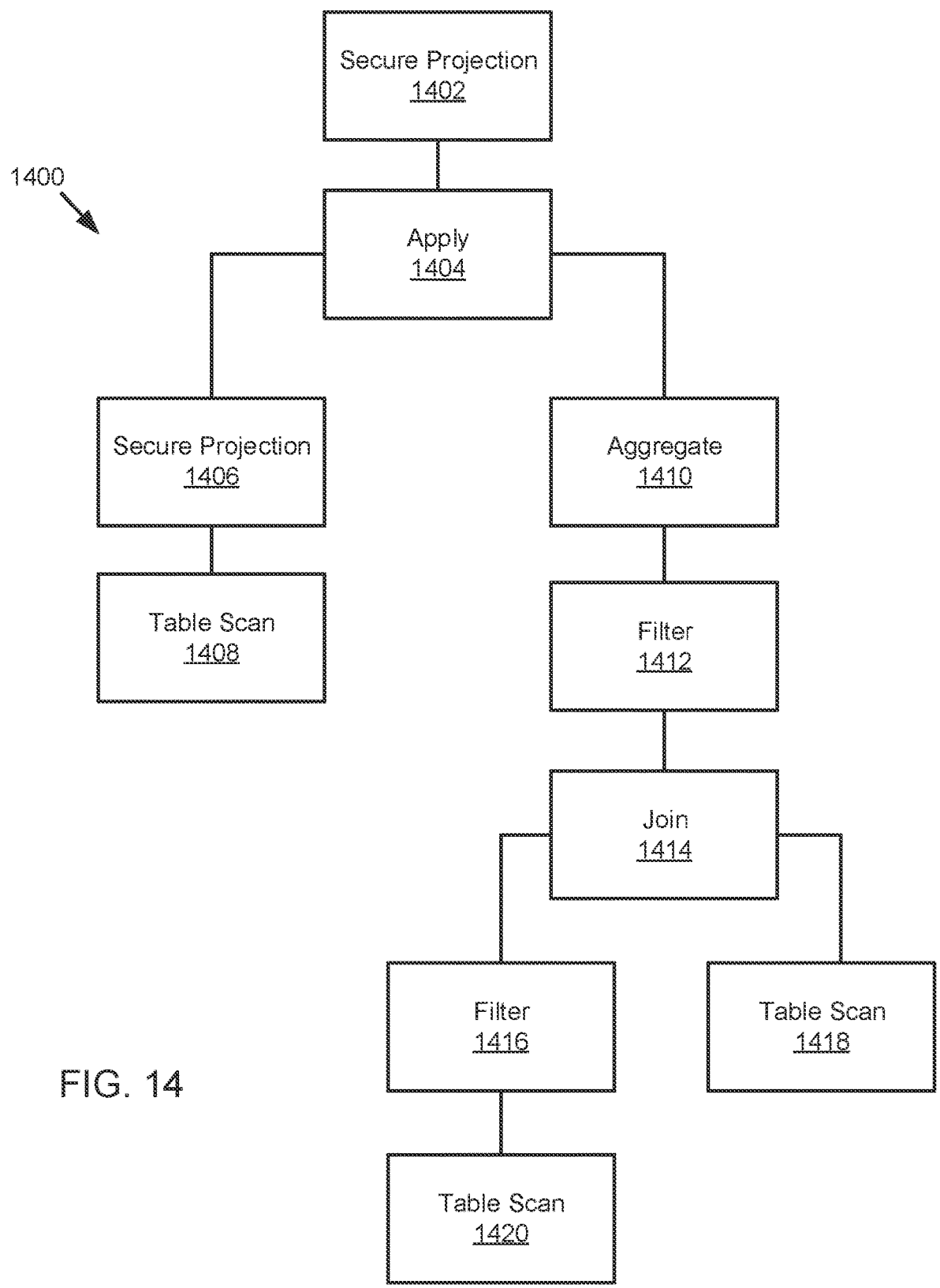
FIG. 14 is a schematic block diagram illustrating a process flow for a query plan utilizing a secure user-defined function, according to one embodiment.

FIG. 14 illustrates a process flow 1400 for a secure plan for a table-valued UDF. The process flow 1400 for a secure table-valued UDF may need to prevent expressions from the left of the Apply 1404 and above the Apply 1404 from moving into the right (UDF) side of the Apply 1404. To achieve this, the use of two Secure Projection nodes is utilized (see 1406 and 1402), where one Secure Projection 1406 is placed above the left input to the Apply 1404 and the other Secure Projection 1402 is placed above the Apply 1404. In addition, any filter predicates on the table function may be placed above the Secure Projection 1402. These changes may be made during query block translation when a lateral view that originates from a secure table UDF is converted to an apply. The process flow 1400 includes the Secure Projection 1402 above the Apply 1404. The left side of the Apply 1404 leads to the Secure Projection 1406 and a table scan 1408. The right side (UDF side) of the Apply 1404 includes the aggregate 1410, filter 1412, and join 1414. The join 1414 leads to a filter 1416 and table scan 1420 or alternatively to a table scan 1418.

Figure 15:
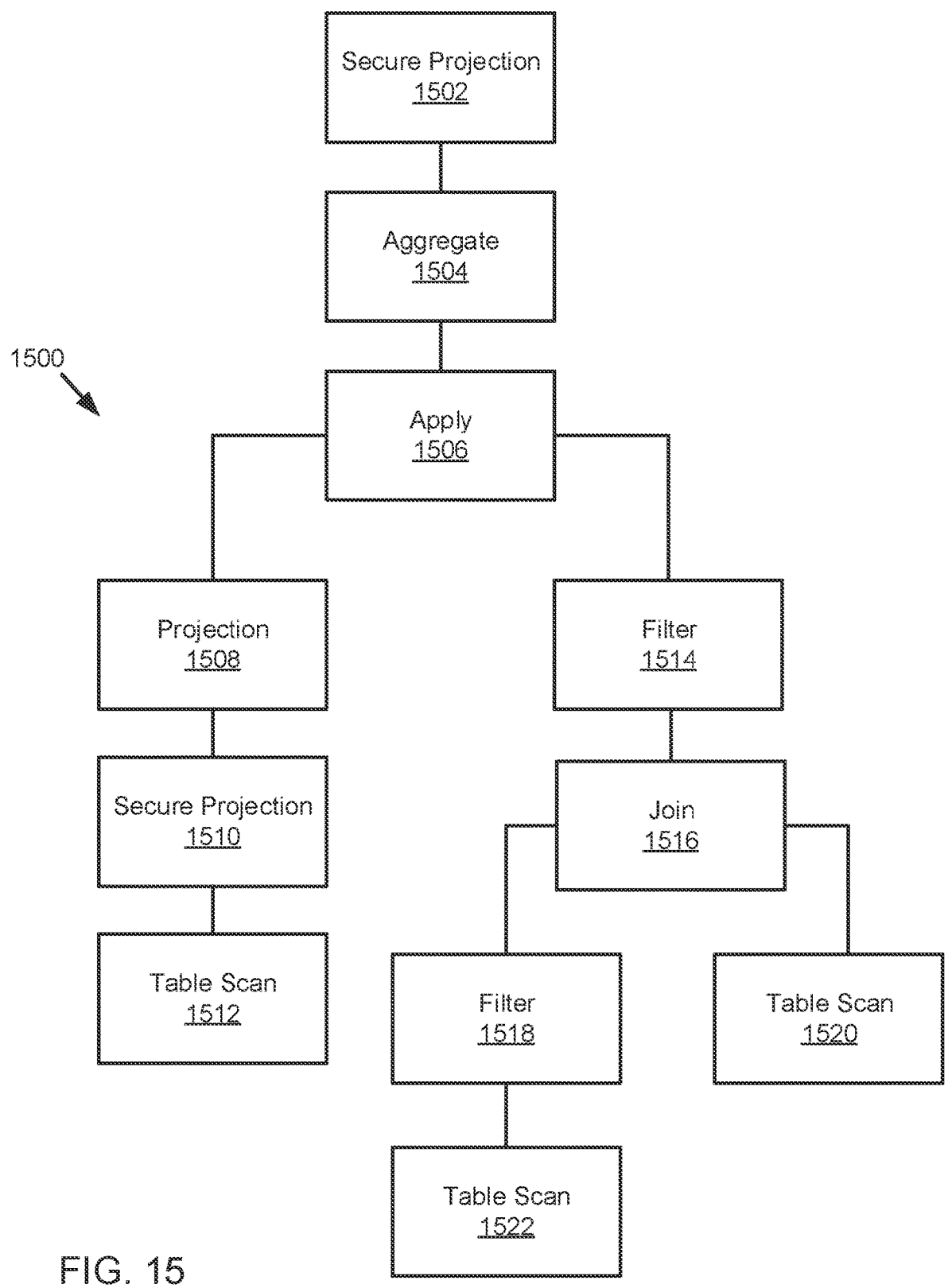
FIG. 15 is a schematic block diagram illustrating a process flow for a query plan utilizing a secure user-defined function, according to one embodiment.

FIG. 15 illustrates a process for 1500 after a non-scalar aggregate apply rule is applied. A secure projection 1502 and aggregate 1504 are placed above the apply 1506. The left side of the apply 1506 includes a projection 1508, secure projection 1510, and table scan 1512. The right side (UDF side) of the apply 1506 includes a filter 1514 and join 1516. The join 1516 includes a filter 1518 and table scan 1522 and alternatively leads to a table scan 1520.

Figure 16:
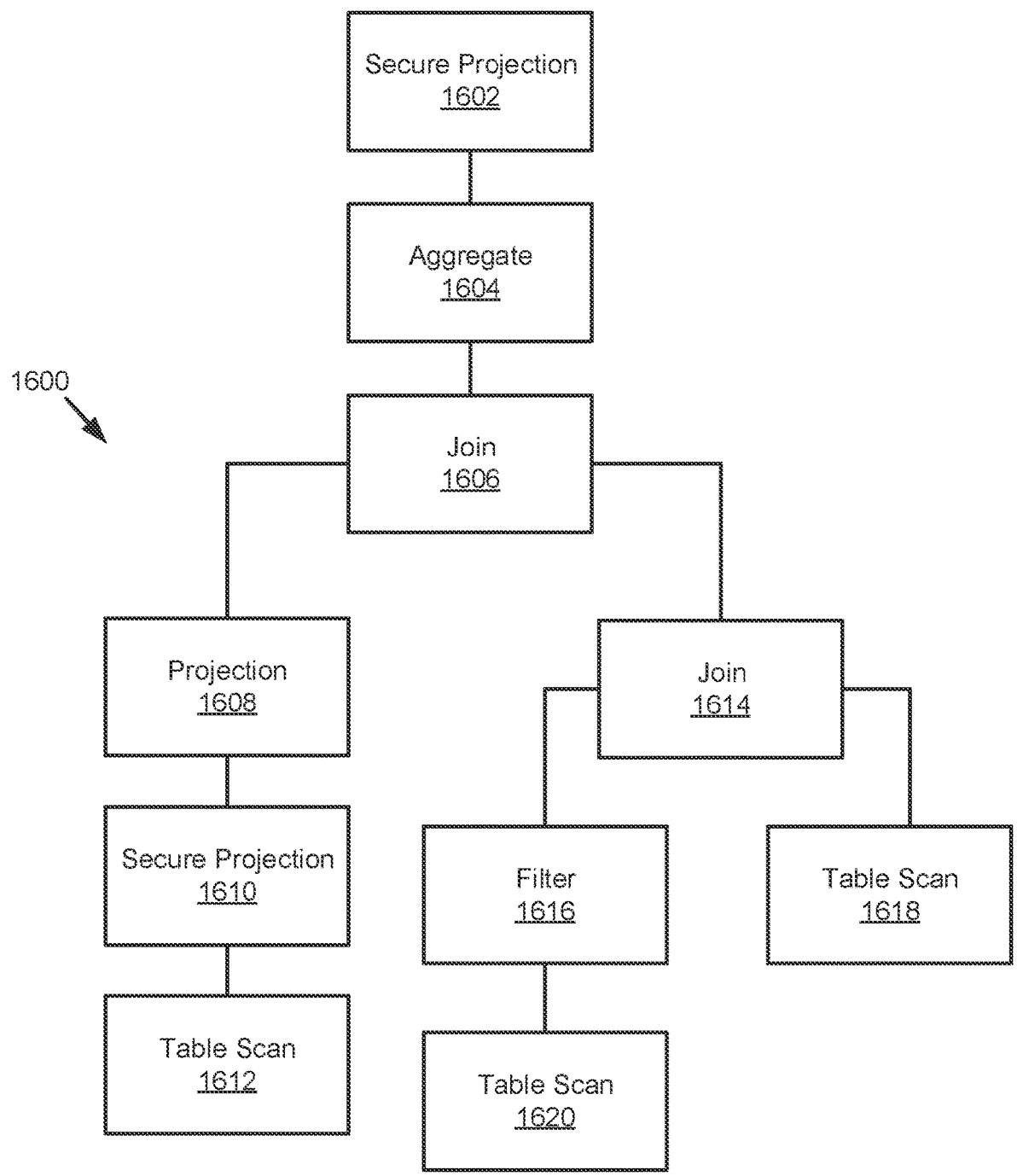
FIG. 16 is a schematic block diagram illustrating a process flow for a query plan utilizing a secure user-defined function, according to one embodiment.

FIG. 16 illustrates a process flow 1600 after a convert apply to join rule is applied. The secure projection 1602 and aggregate 1604 are placed above the join 1606. The left side of the join 1606 includes a projection 1608, secure projection 1610, and table scan 1612. The right side of the join 1606 includes a join 1614. The join 1614 leads to a filter 1616 and table scan 1620 or alternatively to a table scan 1618.

In an embodiment, a secure projection disallows potentially unsafe expressions from being pushed down through the projection and prevents all expressions from being pulled up above the projection. Unsafe left side expressions may never make it out of the left side of the plan and unsafe expressions above the Apply will not be pushed down below the join that eventually replaces Apply.

Figure 17:
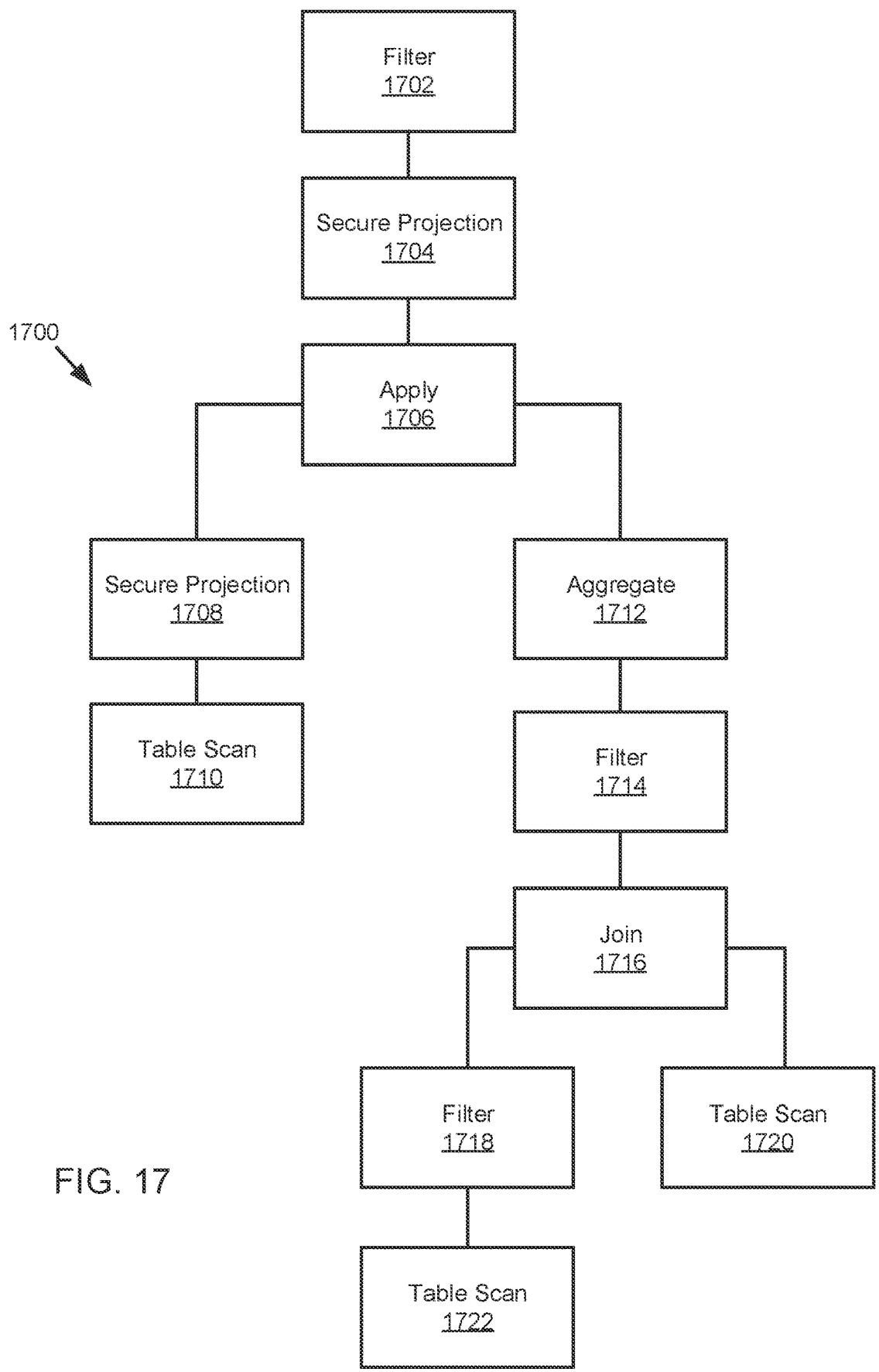
FIG. 17 is a schematic block diagram illustrating a process flow for a query plan utilizing a secure user-defined function, according to one embodiment.

FIG. 17 illustrates a process flow 1700 before decorrelation. The process flow 1700 includes a filter 1702 and secure projection 1704 placed above the apply 1706. The left side of the apply 1706 includes a secure projection 1708 and table scan 1710. The right side (UDF side) of the apply 1706 includes an aggregate 1712, filter 1714, and join 1716. The join 1716 includes a filter 1718 and table scan 1722 and alternatively includes a table scan 1720. Because the filter is above a secure projection, it cannot be pushed down below the boundary of the UDF.

Figure 18:
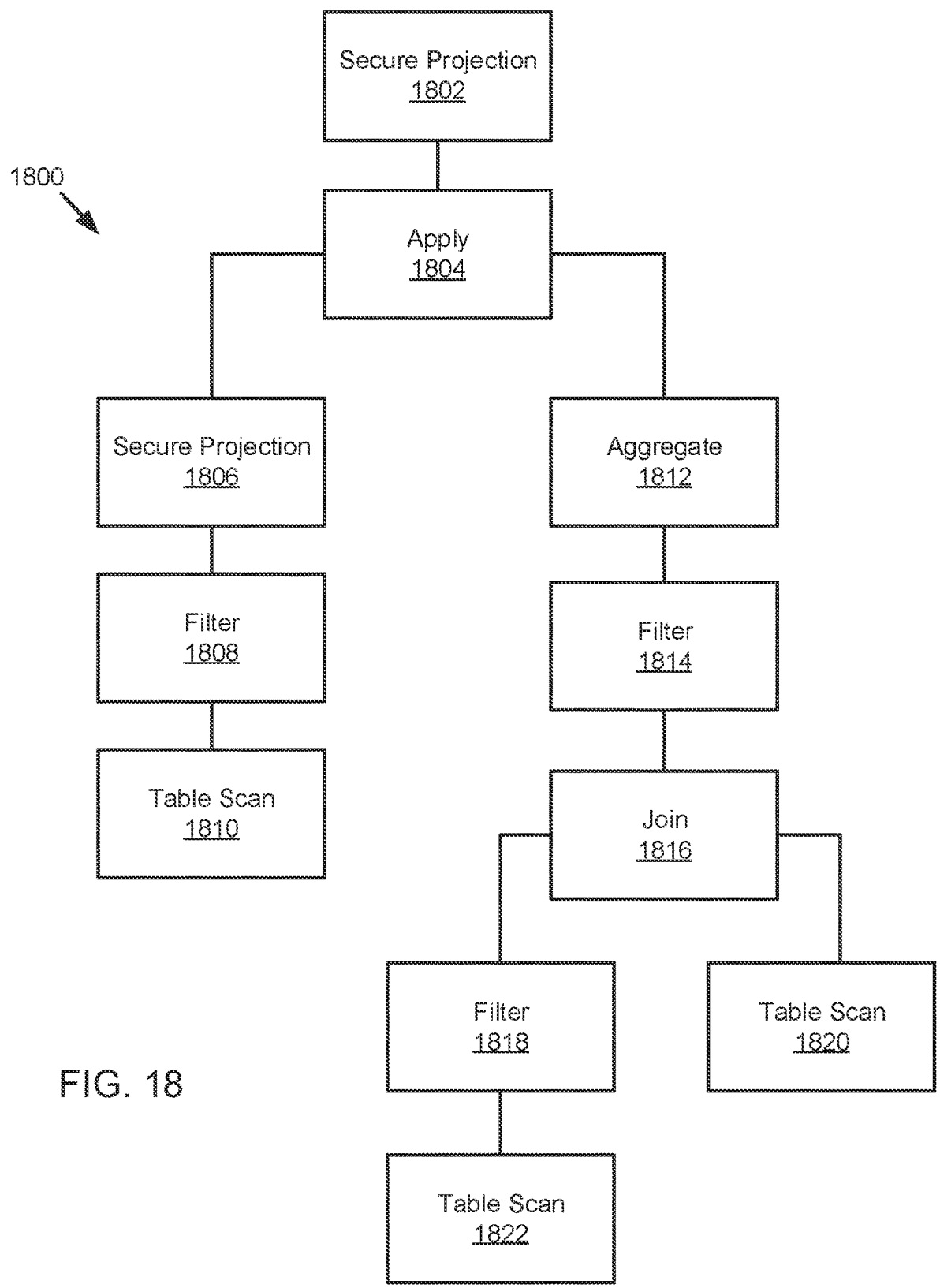
FIG. 18 is a schematic block diagram illustrating a process flow for a query plan utilizing a secure user-defined function, according to one embodiment.

FIG. 18 illustrates a process flow 1800 before decorrelation. The process flow 1800 includes a secure projection 1802 above the apply 1804. The left side of the apply 1804 includes a secure projection 1806, filter 1808, and table scan 1810. The right side (UDF side) of the apply 1804 includes an aggregate 1812, filter 1814, and join 1816. The join 1816 includes a filter 1818 and table scan 1822 and alternatively leads to a table scan 1820. Because the filter is below a secure projection, it cannot be pulled up and pushed to the right side of the apply 1804.

In an embodiment, a scalar UDF may be replaced by some subqueries during UDF expansion, which are later converted to Apply during query rewrite before decorrelation. Further, an early subquery rewrite pass may be performed before the query is converted to its plan representation. Unnesting of the secure subqueries may be disallowed at that point such that there is no need to handle secure decorrelation in one place. The Secure Projection nodes above and to the left of Apply for subqueries coming from secure scalar UDFs.

In an embodiment, placing a Secure Projection above the left input to the Apply prevents join reordering between the left input and the join generated from the Apply. Placing a Secure Projection above the Apply may likewise prevent join reordering above and below the Apply. An alternative may include implementing specific decorrelation rules to apply to secure UDFs.

Figure 19:
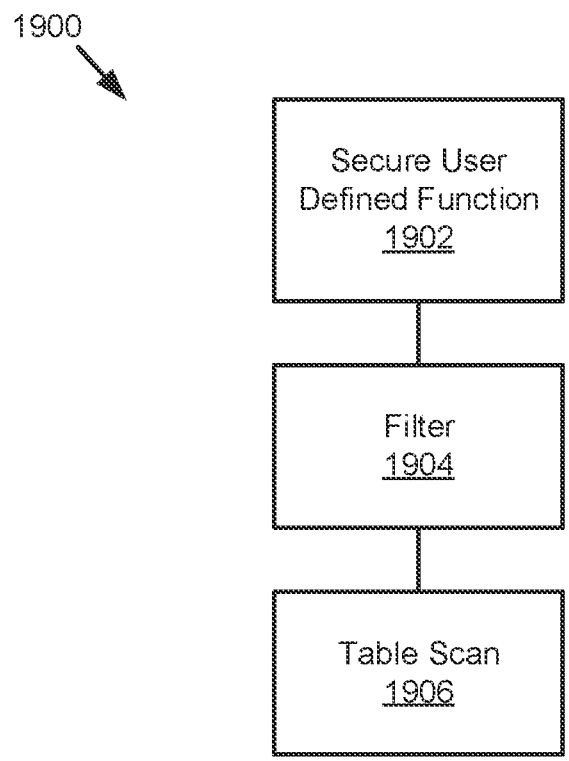
FIG. 19 is a schematic block diagram illustrating a process flow for a query as it appears in a query profile, according to one embodiment.

FIG. 19 illustrates a process flow 1900 for a query as it will appear in the query profile. The query profile will not expose details of what a secure SQL UDF does, including the tables that are accessed, the amount of data processed, and so forth. A secure view is displayed in the query profile as a single node, secure view, and none of the details of the underlying plan are exposed. The process flow 1900 includes a secure user defined function 1902 leading to a filter 1904 and a table scan 1906. The query history and query details pages of the user interface may include information about the bytes and partitions scanned by the query. Where a query contains a secure view, this information is not sent to the user interface when it requests the query monitory statistics. Queries including secure UDFs may be treated the same way.

Figure 20:
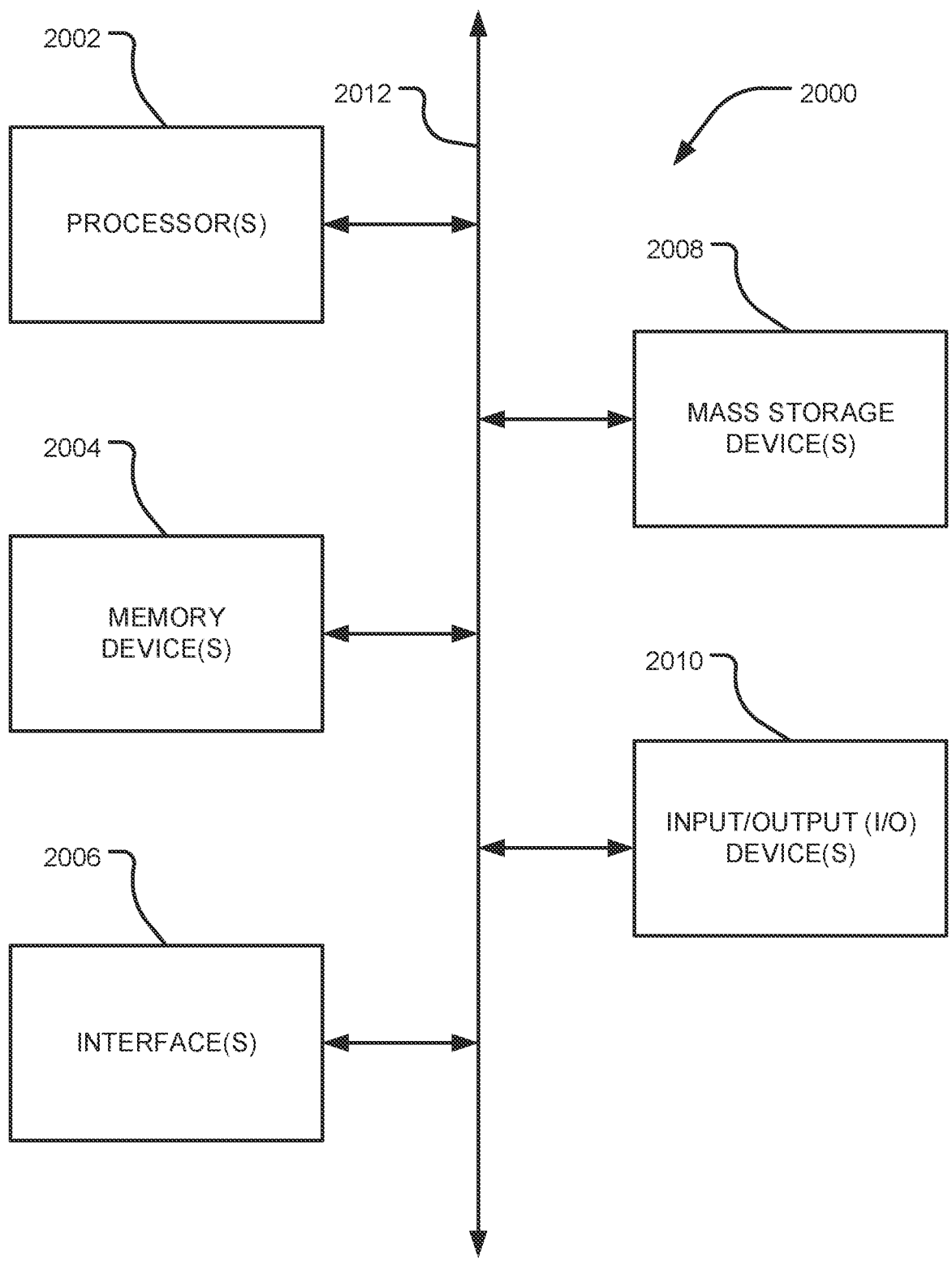
FIG. 20 is a block diagram depicting an example computing device or system consistent with one or more embodiments disclosed herein.

FIG. 20 is a block diagram depicting an example computing device 2000. In some embodiments, computing device 2000 is used to implement one or more of the systems and components discussed herein. Further, computing device 2000 may interact with any of the systems and components described herein. Accordingly, computing device 2000 may be used to perform various procedures and tasks, such as those discussed herein. Computing device 2000 can function as a server, a client or any other computing entity. Computing device 2000 can be any of a wide variety of computing devices, such as a desktop computer, a notebook computer, a server computer, a handheld computer, a tablet, and the like.

Computing device 2000 includes one or more processor(s) 2002, one or more memory device(s) 2004, one or more interface(s) 2006, one or more mass storage device(s) 2008, and one or more Input/Output (I/O) device(s) 2010, all of which are coupled to a bus 2012. Processor(s) 2002 include one or more processors or controllers that execute instructions stored in memory device(s) 2004 and/or mass storage device(s) 2008. Processor(s) 2002 may also include various types of computer-readable media, such as cache memory.

Memory device(s) 2004 include various computer-readable media, such as volatile memory (e.g., random access memory (RAM)) and/or nonvolatile memory (e.g., read-only memory (ROM)). Memory device(s) 2004 may also include rewritable ROM, such as Flash memory.

Mass storage device(s) 2008 include various computer readable media, such as magnetic tapes, magnetic disks, optical disks, solid state memory (e.g., Flash memory), and so forth. Various drives may also be included in mass storage device(s) 2008 to enable reading from and/or writing to the various computer readable media. Mass storage device(s) 2008 include removable media and/or non-removable media.

I/O device(s) 2010 include various devices that allow data and/or other information to be input to or retrieved from computing device 2000. Example I/O device(s) 2010 include cursor control devices, keyboards, keypads, microphones, monitors or other display devices, speakers, printers, network interface cards, modems, lenses, CCDs or other image capture devices, and the like.

Interface(s) 2006 include various interfaces that allow computing device 2000 to interact with other systems, devices, or computing environments. Example interface(s) 2006 include any number of different network interfaces, such as interfaces to local area networks (LANs), wide area networks (WANs), wireless networks, and the Internet.

Bus 2012 allows processor(s) 2002, memory device(s) 2004, interface(s) 2006, mass storage device(s) 2008, and I/O device(s) 2010 to communicate with one another, as well as other devices or components coupled to bus 2012. Bus 2012 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 2000 and are executed by processor(s) 2002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein.

Figure 21:
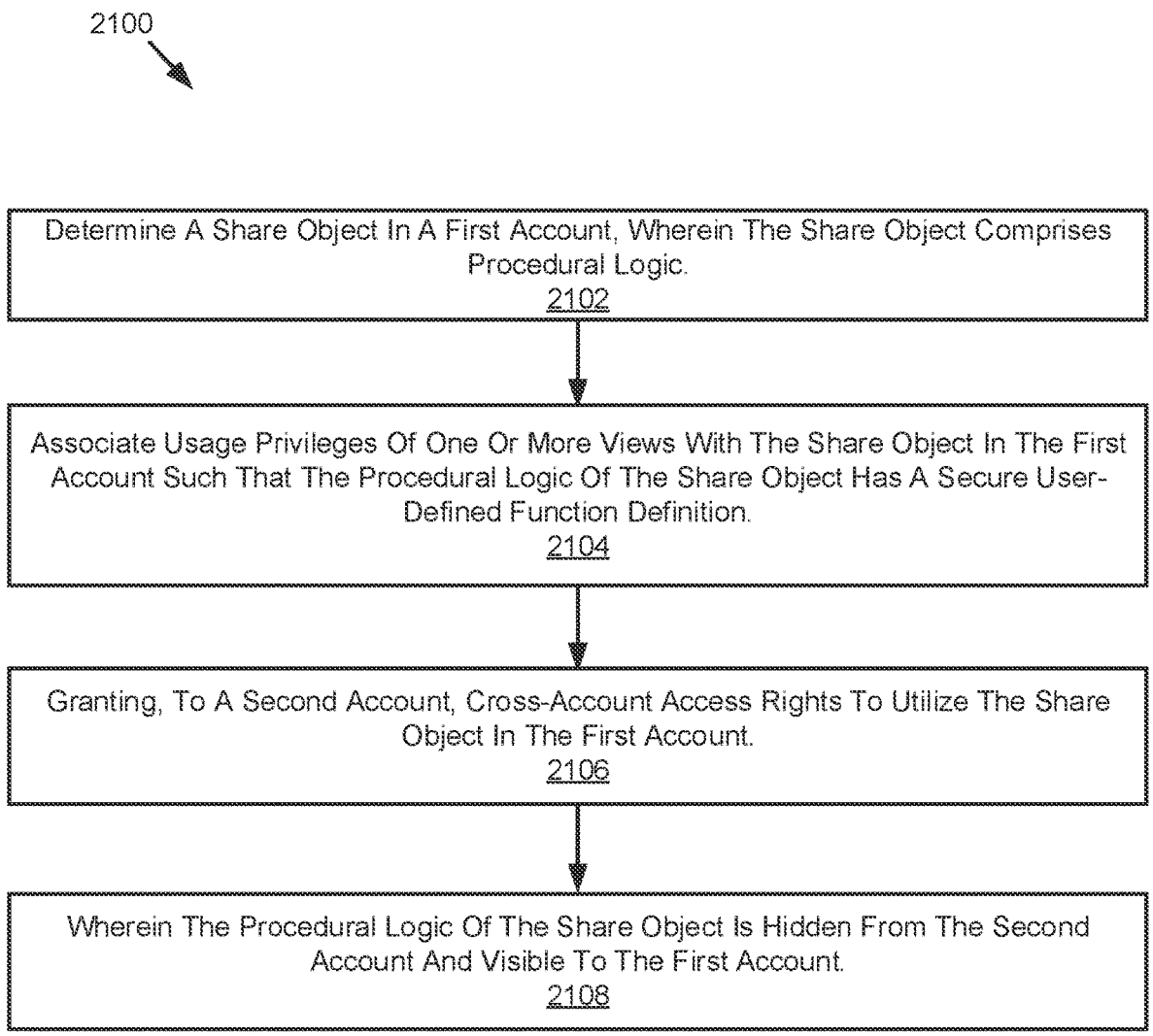
FIG. 21 is a schematic flow chart diagram illustrating an example method for implementing secure views of a user-defined function in zero-copy data sharing in a multi-tenant database system, according to one embodiment.

FIG. 21 is a schematic flow chart diagram illustrating an example method 2100 for implementing a secure user-defined function in zero-copy data sharing in a multi-tenant database system. The method 2100 may be performed by a database system, such as by a share component 210 as in FIG. 1 or 9 or by a database system as in FIG. 1, 2, or 3.

The method 2100 begins and a computing device determines at 2102 a share object in a first account, wherein the share object comprises procedural logic. The method 2100 continues and the computing device associates at 2104 usage privileges of one or more views with the share object in the first account such that the procedural logic of the share object has a secure user-defined function definition. The method 2100 continues and the computing device grants at 2106, to a second account, cross-account access rights to utilize the share object in the first account. It is noted at 2108 that the method 2100 is such that the procedural logic of the share object is hidden from the second account and visible to the first account.

EXAMPLES

The following examples pertain to further embodiments.

Example 1 is a method for providing secure views for shared data in a multi-tenant database. The method includes generating a share object in a first account comprising a share role. The method includes associating usage privileges of one or more views with the share object such that an underlying detail of the share object comprises a secure user-defined function definition. The method includes granting, to a second account, cross-account access rights to the share role or share object in the first account. The method includes receiving a request from the second account to access data or services of the first account and providing a response to the second account based on the data or services of the first account. The method is such that the underlying detail of the share object comprising the secure user-defined function definition is hidden from the second account and visible to the first account.

Example 2 is a method as in Example 1, wherein the underlying detail of the share object comprises one or more of: a data field of an underlying table of the share object; a structural element of an underlying table of the share object; or a quantity of data in an underlying table of the share object.

Example 3 is a method as in any of Examples 1-2, wherein the secure user-defined function definition is hidden from the second account and visible to the first account.

Example 4 is a method as in any of Examples 1-3, wherein the share object comprises: an object name unique to the first account; an object role; and a reference list comprising a list of one or more second accounts that are eligible to access the share object.

Example 5 is a method as in any of Examples 1-4, wherein associating usage privileges of one or more views with the share object comprises one or more of: altering a table data persistence object of an underlying table of the share object; or attaching a secure flag to an underlying data field of the share object, wherein the secure flag indicates that the underlying data field of the share object is protected by a secure view.

Example 6 is a method as in any of Examples 1-5, further comprising annotating the request from the second account to designate the request as coming from a secure view.

Example 7 is a method as in any of Examples 1-6, further comprising restricting the request from the second account from being merged with an external query block or expression.

Example 8 is a method as in any of Examples 1-7, further comprising annotating the request from the second account with a safety property indicating whether the request is safe.

Example 9 is a method as in any of Examples 1-8, wherein the request is safe if: the request is known to produce no errors; and the request does not comprise a user-defined function.

Example 10 is a method as in any of Examples 1-9, wherein receiving the request from the second account comprises receiving an alias object comprising a unique name, wherein the alias object is linked to a top-most object in a shared object hierarchy.

Example 11 is a method as in any of Examples 1-10, wherein providing the response to the second account comprises granting the alias object usage privileges on an activated role within the share object.

Example 12 is a system for providing secure views for shared data in a multi-tenant database. The system includes means for determining that a first account has granted a second account access to a database object of the first account. The system includes means for associating view privileges for the database object of the first account such that an underlying detail of the database object comprises a secure user-defined function definition. The system includes means for receiving a request from the second account to access the database object of the first account. The system includes means for processing the request using a virtual warehouse corresponding to the second account, wherein the virtual warehouse comprises a set of one or more computer nodes configured to access data in a storage layer corresponding to the first account to generate a response to the request. The system is such that the underlying detail of the database object that comprises the secure user-defined function definition is hidden from the second account and visible to the first account.

Example 13 is a system as in Example 12, wherein the means for determining that the first account has granted a second account access comprises means for determining that the first account lists the second account as having rights to a share object or share role in the first account, wherein the share object or share role has access rights to the database object of the first account.

Example 14 is a system as in any of Examples 12-13, wherein the means for receiving the request comprises means for receiving a request directed toward an alias object in the second account, wherein the alias object is linked with the database object.

Example 15 is a system as in any of Examples 12-14, wherein the means for implementing privileges for the database object of the first account comprises one or more of: means for altering a table data persistence object for an underlying table of the database object; or means for attaching a secure flag to an underlying data field of the database object, wherein the secure flag indicates that the underlying data field of the database object is protected by a secure view.

Example 16 is a system as in any of Examples 12-15, further comprising a means for annotating the request from the second account to designate the request as coming from a secure view.

Example 17 is a system as in any of Examples 12-16, wherein the underlying detail of the database object comprises one or more of: a data field of an underlying table of the database object; a structural element of an underlying table of the database object; or a quantity of data in the database object.

Example 18 is non-transitory computer readable storage media storing instructions that, when executed by one or more processors, cause the one or more processors to: generate a share object in a first account comprising a share role; associate view privileges for the share object such that an underlying detail of the share object comprises a secure user-defined function definition; grant, to a second account, cross-account access rights to the share role or share object in the first account; receive a request from the second account to access data or services of the first account; and provide a response to the second account based on the data or services of the first account; wherein the underlying detail of the share object that comprises the secure user-defined function definition is hidden from the second account and visible to the first account.

Example 19 is non-transitory computer readable storage media as in Example 18, wherein the underlying detail of the share object comprises one or more of: a data field of an underlying table of the share object; a structural element of an underlying table of the share object; or a quantity of data in an underlying table of the share object.

Example 20 is non-transitory computer readable storage media as in any of Examples 18-19, wherein the secure user-defined function definition is hidden from the second account and visible to the first account.

Example 21 is non-transitory computer readable storage media as in any of Examples 18-20, wherein the share object of the first account comprises one or more of a database object, a schema, a table, a sequence, or a function.

Example 22 is non-transitory computer readable storage media as in any of Examples 18-21, wherein the instructions further cause the one or more processors to store a list of objects for which the share role has access rights.

Example 23 is non-transitory computer readable storage media as in any of Examples 18-22, wherein the instructions cause the one or more processors to grant the cross-account access rights by storing an indication of the second account in a reference list of accounts that have rights to the share role or share object in the first account.

Example 24 is non-transitory computer readable storage media as in any of Examples 18-23, wherein the instructions cause the one or more processors to receive the request by receiving a request directed to an alias object in the second account.

Example 25 is non-transitory computer readable storage media as in any of Examples 18-24, wherein the instructions cause the one or more processors to provide the response by processing the request without creating a duplicate table or other data source in the second account.

Example 26 is non-transitory computer readable storage media as in any of Examples 18-25, wherein the share object comprises: an object name unique to the first account; an object role; and a reference list comprising a list of one or more second accounts that are eligible to access the share object.

Example 27 is non-transitory computer readable storage media as in any of Examples 18-26, wherein the instructions cause the one or more processors to associate view privileges for the share object by one or more of: altering a table data persistence object of an underlying table of the share object; or attaching a secure flag to an underlying data field of the share object, wherein the secure flag indicates that the underlying data field should be protected by a secure view.

Example 28 is non-transitory computer readable storage media as in any of Examples 18-27, wherein the instructions further cause the one or more processors to annotate the request from the second account to designate the request as coming from a secure view.

Example 29 is non-transitory computer readable storage media as in any of Examples 18-28, wherein the instructions further cause the one or more processors to restrict the request from the second account from being merged with an external query block or expression.

Example 30 is non-transitory computer readable storage media as in any of Examples 18-29, wherein the instructions further cause the one or more processors to annotate the request from the second account with a safety property indicating whether the request is safe, and wherein the request is safe if: the request is known to produce no errors; and the request does not comprise a user-defined function.

Example 31 is a method for providing secure view in a multi-tenant database. The method includes determining a share object in a first account, wherein the share object comprises procedural logic. The method includes associating usage privileges of one or more views with the share object in the first account such that the procedural logic of the share object has a secure user-defined function definition. The method includes granting, to a second account, cross-account access rights to utilize the share object in the first account. The method is such that the procedural logic of the share object is hidden from the second account and visible to the first account.

Example 32 is a method as in Example 31, wherein the share object further comprises one or more of: a data field of an underlying table of the share object; a structural element of an underlying table of the share object; or a quantity of data in an underlying table of the share object.

Example 33 is a method as in any of Examples 31-32, wherein the secure user-defined function definition of the share object is hidden from the second account and visible to the first account.

Example 34 is a method as in any of Examples 31-33, wherein the share object comprises a user-defined function governed by the procedural logic.

Example 35 is a method as in any of Examples 31-34, further comprising: receiving a request from the second account to implement the user-defined function governed by the procedural logic of the share object in the first account; receiving a query from the second account; and responding to the query from the second account by implementing the user-defined function.

Example 36 is a method as in any of Examples 31-35, wherein responding to the query comprises responding such that a function of the share object is hidden from the second account, wherein the function comprises one or more of: a table accessed according to the user-defined function; or a quantity of data processed according to the user-defined function.

Example 37 is a method as in any of Examples 31-36, wherein the procedural logic of the user-defined function of the share object in the first account is hidden from the second account and is visible to the first account.

Example 38 is a method as in any of Examples 31-37, further comprising annotating the request from the second account to designate the request as coming from a secure view.

Example 39 is a method as in any of Examples 31-38, wherein the user-defined function is a scalar user-defined function comprising parameters such that the scalar user-defined function returns a single row and a single column, and wherein responding to the query from the second account comprises providing one or more of a simple SQL expression or a subquery.

Example 40 is a method as in any of Examples 31-39, wherein the user-defined function is a table-valued user-defined function comprising a correlated table, and wherein the table-valued user-defined function governs each of: restricting the second account from viewing the secure user-defined function definition; restricting the second account from viewing underlying data of the share object; and restricting the second account from viewing data that is filtered out by the secure user-defined function definition.

Example 41 is a method as in any of Examples 31-40, wherein the share object is accessible in a query profile of the second account as a single node, and wherein the procedural logic is not exposed in the query profile.

Example 42 is a system for providing secure view in a multi-tenant database. The system includes means for determining a share object in a first account, wherein the share object comprises procedural logic. The system includes means for associating usage privileges of one or more views with the share object in the first account such that the procedural logic of the share object has a secure user-defined function definition. The system includes means for granting, to a second account, cross-account access rights to utilize the share object in the first account. The system is such that the procedural logic of the share object is hidden from the second account and visible to the first account.

Example 43 is a system as in Example 42, wherein the share object further comprises one or more of: a data field of an underlying table of the share object; a structural element of an underlying table of the share object; or a quantity of data in an underlying table of the share object.

Example 44 is a system as in any of Examples 42-43, wherein the share object comprises a user-defined function governed by the procedural logic.

Example 45 is a system as in any of Examples 42-44, further comprising: means for receiving a request from the second account to implement the user-defined function governed by the procedural logic of the share object in the first account; means for receiving a query from the second account; and means for responding to the query from the second account by implementing the user-defined function.

Example 46 is a system as in any of Examples 42-45, wherein the means for responding to the query is configured to respond such that a function of the share object is hidden from the second account, wherein the function comprises one or more of: a table access according to the user-defined function; or a quantity of data processed according to the user-defined function.

Example 47 is a system as in any of Examples 42-46, wherein the user-defined function is a scalar user-defined function comprising parameters such that the scalar user-defined function returns a single row and a single column, and wherein responding to the query from the second account comprises providing one or more of a simple SQL expression or a subquery.

Example 48 is a system as in any of Examples 42-47, wherein the user-defined function is a table-valued user-defined function comprising a correlated table, and wherein the table-valued user-defined function governs each of: restricting the second account from viewing the secure user-defined function definition; restricting the second account from viewing underlying data of the share object; and restricting the second account from viewing data that is filtered out by the secure user-defined function definition.

Example 49 is a non-transitory computer readable storage media storing instructions that, when executed by one or more processors, cause the one or more processors to: determine a share object in a first account, wherein the share object comprises procedural logic; associate usage privileges of one or more views with the share object in the first account such that the procedural logic of the share object has a secure user-defined function definition; and grant, to a second account, cross-account access rights to utilize the share object in the first account; wherein the procedural logic of the share object is hidden from the second account and visible to the first account.

Example 50 is a non-transitory computer readable storage media as in Example 49, wherein the share object further comprises one or more of: data field of an underlying table of the share object; a structural element of an underlying table of the share object; or a quantity of data in an underlying table of the share object.

Example 51 is a non-transitory computer readable storage media as in any of Example 49-50, wherein the share object comprises a user-defined function governed by the procedural logic, and wherein the instructions further cause the one or more processors to: receive a request from the second account to implement the user-defined function governed by the procedural logic of the share object in the first account; receive a query from the second account; and respond to the query from the second account by implementing the user-defined function.

Example 52 is an apparatus including means to perform a method or realize an apparatus or system as in any of Examples 1-51.

Example 53 is a machine-readable storage including machine-readable instructions, when executed, to implement a method or realize an apparatus of any of Examples 1-51.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A multi-tenant database system comprising:
a memory; and
one or more processors operatively coupled to the memory, the one or more processors to:
receive a grant to access a share object comprising a plurality of functions associated with a secure user-defined function (UDF) to underlying data;
access the share object using the grant;
send a request to a share component to cause the share component to:
determine that a first function of the plurality of functions produces errors;
annotate the first function of the plurality of functions with a safety property indicating that the first function produces errors;
implement a second function of the plurality of functions by pushing the second function through a secure view boundary;
prevent, based on the safety property, an implementation of the second function by ensuring that the second function is not pushed through the secure view boundary;
hide the secure UDF from a second account having access to a view associated with a first account by modifying an output of commands to prevent the second account from receiving the secure UDF; and
receive, by the first account from the secure UDF, the functionality to the underlying data, wherein the functionality prevents the first account from using the functionality to access unauthorized data by preventing the first account from receiving metadata associated with the underlying data.

2. The multi-tenant database system of claim 1, wherein the share object further comprises one or more of:
a data field of an underlying table of the share object;
a structural element of an underlying table of the share object; or
a quantity of data in an underlying table of the share object.

3. The multi-tenant database system of claim 1, wherein the grant to access the share object is without access rights to a view of a procedural logic associated with the secure UDF, and wherein the procedural logic associated with the secure UDF comprises one or more of:
a table access according to the secure UDF; or
a quantity of data processed according to the secure UDF.

4. The multi-tenant database system of claim 1, wherein the secure UDF is a scalar UDF comprising parameters such that the scalar UDF returns at least one of a single row or a single column, and further comprising:
receiving one or more of a simple SQL expression or a subquery.

5. The multi-tenant database system of claim 1, wherein the secure UDF is a table-valued UDF comprising a correlated table.

6. The multi-tenant database system of claim 1, wherein the grant to access the share object is without access rights to a view of a procedural logic associated with the secure UDF.

7. A method, comprising:
receiving a grant to access a share object comprising a plurality of functions associated with a secure user-defined function (UDF) to underlying data;
accessing the share object using the grant;
sending a request to a share component to cause the share component to:
determine that a first function of the plurality of functions produces errors;
annotate the first function of the plurality of functions with a safety property indicating that the first function produces errors;
implement a second function of the plurality of functions by pushing the second function through a secure view boundary;
prevent, based on the safety property, an implementation of the second function by ensuring that the second function is not pushed through the secure view boundary;
hide the secure UDF from a second account having access to a view associated with a first account by modifying an output of commands to prevent the second account from receiving the secure UDF; and
receiving, from the secure UDF, the functionality to the underlying data, wherein the functionality prevents the first account from using the functionality to access unauthorized data by preventing the first account from receiving metadata associated with the underlying data.

8. The method of claim 7, wherein the share object further comprises one or more of:
a data field of an underlying table of the share object;
a structural element of an underlying table of the share object; or
a quantity of data in an underlying table of the share object.

9. The method of claim 7, wherein the grant to access the share object is without access rights to a view of a procedural logic associated with the secure UDF, and wherein the procedural logic associated with the secure UDF comprises one or more of:
a table accessed according to the secure UDF; or
a quantity of data processed according to the secure UDF.

10. The method of claim 7, wherein the secure UDF is a scalar UDF comprising parameters such that the scalar UDF returns at least one of a single row or a single column, and further comprising:
receiving one or more of a simple SQL expression or a subquery.

11. The method of claim 9, wherein the share object is accessible in a query profile as a single node.

12. The method of claim 11, wherein the procedural logic is not exposed in the query profile.

13. The method of claim 7, wherein the grant to access the share object is without access rights to a view of a procedural logic associated with the secure UDF.

14. A non-transitory computer readable storage media storing instructions that, when executed by one or more processors of a multi-tenant database, cause the one or more processors to:
receive, by the one or more processors, a grant to access a share object comprising functionality associated with a secure user-defined function (UDF) to underlying data;
access, by the one or more processors, the share object using the grant;

send a request to a share component to cause the share component to:
  determine that a first function of the plurality of functions produces errors;
  annotate the first function of the plurality of functions with a safety property indicating that the first function produces errors;
  implement a second function of the plurality of functions by pushing the second function through a secure view boundary;
  prevent, based on the safety property, an implementation of the second function by ensuring that the second function is not pushed through the secure view boundary;
  hide the secure UDF from a second account having access to a view associated with a first account by modifying an output of commands to prevent the second account from receiving the secure UDF; and
receive, by the first account from the secure UDF, the functionality to the underlying data, wherein the functionality prevents the first account from using the functionality to access unauthorized data by preventing the first account from receiving metadata associated with the underlying data.

15. The non-transitory computer readable storage media of claim 14, wherein the share object further comprises one or more of:
  a data field of an underlying table of the share object;
  a structural element of an underlying table of the share object; or
  a quantity of data in an underlying table of the share object.

16. The non-transitory computer readable storage media of claim 14, wherein the grant to access the share object is without access rights to a view of a procedural logic associated with the secure UDF, and wherein the procedural logic associated with the secure UDF comprises one or more of:
  a table access according to the secure UDF; or
  a quantity of data processed according to the secure UDF.

17. The non-transitory computer readable storage media of claim 14, wherein the grant to access the share object is without access rights to a view of a procedural logic associated with the secure UDF.

* * * * *